(12) United States Patent
Tao et al.

(10) Patent No.: US 6,441,832 B1
(45) Date of Patent: *Aug. 27, 2002

(54) HIERARCHICAL PROCESSING APPARATUS AND HIERARCHICAL PROCESSING METHOD FOR VIDEO AND AUDIO DATA

(75) Inventors: Akihiko Tao; Shigeki Takeuchi; Shina Ueno; Yoko Komori, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 08/978,846

(22) Filed: Nov. 26, 1997

(30) Foreign Application Priority Data

Nov. 28, 1996 (JP) ................................. 8-332927

(51) Int. Cl.[7] ................................. G09G 5/00
(52) U.S. Cl. ........................ 345/723; 725/47
(58) Field of Search ................. 345/328, 326, 345/327, 329, 333, 302, 716–723, 733, 835; 386/95, 109, 124; 348/8–9; 725/109–153, 37–61

(56) References Cited

U.S. PATENT DOCUMENTS

| | | | | |
|---|---|---|---|---|
| 5,404,316 A | * | 4/1995 | Klingler et al. | 345/328 |
| 5,649,171 A | * | 7/1997 | Craven et al. | 703/23 |
| 5,680,619 A | * | 10/1997 | Gudmundson et al. | 717/1 |
| 5,752,029 A | * | 5/1998 | Wissner | 707/104 |
| 5,774,583 A | * | 6/1998 | Sasaki et al. | 382/190 |
| 5,861,880 A | * | 1/1999 | Shimizu et al. | 345/302 |
| 5,892,535 A | * | 4/1999 | Allen et al. | 348/9 |
| 6,009,234 A | * | 12/1999 | Taira et al. | 386/95 |

* cited by examiner

Primary Examiner—Raymond J. Bayerl
Assistant Examiner—Tadesse Hailu
(74) Attorney, Agent, or Firm—Frommer Lawrence & Haug LLP; William S. Frommer; Gordon Kessler

(57) ABSTRACT

A hierarchical processing apparatus and method for video and audio data for producing, modifying or deleting a playlist formed from information of reproduction times, channels and so forth of programs in the form of video and audio data is disclosed. The hierarchical processing apparatus includes an image of a first hierarchy for displaying a plurality of playlists formed from a plurality of clips which are video and audio data and additional information corresponding to the clips in a list and selecting one of the playlists to determine a playlist of an object of modification or a playlist of an object of deletion, and an image of a second hierarchy for selecting one of the plurality of clips and adding, to the selected clip, corresponding additional information to produce or modify the playlist. The image of the first hierarchy and the image of the second hierarchy allow transition therebetween in a series of operations. Further, they allow reproduction of the video and audio data of a clip included in the selected playlist at any time. Consequently, while a result of a work is confirmed, editing of a playlist can be performed, thereby improving the efficiency in editing.

14 Claims, 19 Drawing Sheets

FIG. 12

| Event | Start | Total Duration | Duration | Clip ID |
|---|---|---|---|---|
| 001 | 06:00:00 | | 00:00:30 | |
| 002 | 06:00:30 | | 00:00:30 | 00000001 |
| 003 | | | 00:00:30 | 00000005 |
| 004 | | | 00:00:15 | 00000017 |
| 005 | | | 00:00:45 | 00000013 |
| 006 | | 00:02:03 | 00:00:30 | 00000002 |
| 007 | 06:03:00 | | 00:05:00 | |
| 008 | 06:08:00 | | 00:00:45 | 00000030 |
| 009 | | | 00:00:30 | 00000021 |
| 010 | | 00:02:15 | 00:01:00 | 00000018 |
| 011 | 06:10:15 | | 00:18:00 | |
| 012 | 06:28:15 | | 00:00:30 | 00000024 |
| 013 | | | 00:00:30 | 00000021 |
| 014 | | | 00:00:30 | 00000029 |

Playlist Management/Playlist
On-Air-Date: 02/24/96  VSR OUT: 1  PlaylistID: 9602241a Stop

FIG. 13

| Event | Start | ClipID | Title | | Description | Duration | Total Duration |
|---|---|---|---|---|---|---|---|
| 001 | 06:00:00 | 00000001 | PGM | DATA Discmen | | 00:00:30 | |
| 002 | 06:00:30 | 00000005 | | CD-ROM Discmen | | 00:00:30 | |
| 003 | | 00000017 | | MICRO COMPO 301 | | 00:00:15 | |
| 004 | | 00000013 | | letra | | 00:00:45 | |
| 005 | | 00000002 | | Pela Pela | | 00:00:30 | |
| 006 | 06:03:00 | 00000030 | PGM | CASUAL COMPO P2 | Short Version | 00:05:00 | 00:02:30 |
| 007 | 06:08:00 | 00000018 | | Handycem Vision | 2/3-3/E ON-AIR | 00:05:00 | |
| 008 | ... | ... | ... | ... | ... | ... | ... |
| 015 | 06:30:15 | 00000036 | PGM | my first Sany | Long Version | 00:00:30 | 00:02:00 |
| 016 | 06:55:15 | 00000038 | | HOME CONCERT | | 00:25:00 | |
| 017 | | 00000038 | | HOME CONCERT | | 00:01:00 | |
| 018 | | 00000024 | | DYNAPOWAR | Long Version | 00:01:00 | |
| 019 | | | | | | 00:00:30 | |
| 020 | | | | | | | |
| 021 | | | | | | | |

Playout Control/Edit Playlist (Key In)

Save · Cancel · Print · Edit(Mouse) · Playlist Table · Previous · Main Menu

Event: 020  Clip ID: 00000027  Start: 00:00:00  Duration: 00:00:30
● Insert  ○ Overwrite  Delete
Description: KIRARA WASSO
Date: 02/24/96  DD/MM/YY
PlaylistID: 9602241a  VSR OUT: 1

FIG. 16

| PlaylistID | On-Air-Data | VSR OUT |
|---|---|---|
| 9602241a | 02/24/96 | 1 |
| 9602242a | 02/24/96 | 2 |
| 9602242b | 02/24/96 | 2 |
| 9602243a | 02/24/96 | 3 |
| 9602244a | 02/24/96 | 4 |
| 9602245a | 02/24/96 | 5 |
| 9602246a | 02/24/96 | 6 |
| 9602251a | 02/25/96 | 1 |
| 9602252a | 02/25/96 | 2 |
| 9602253a | 02/25/96 | 3 |
| 9602254a | 02/25/96 | 4 |
| 9602255a | 02/25/96 | 5 |
| 9602256a | 02/25/96 | 6 |
| 9602261a | 02/26/96 | 1 |
| 9602262a | 02/26/96 | 2 |
| 9602263a | 02/26/96 | 3 |
| 9602263b | 02/26/96 | 3 |

Open

Cancel

HIERARCHICAL PROCESSING APPARATUS AND HIERARCHICAL PROCESSING METHOD FOR VIDEO AND AUDIO DATA

BACKGROUND OF THE INVENTION

This invention relates to a hierarchical processing apparatus and a hierarchical processing method for video and audio data, and more particularly to a hierarchical processing apparatus and a hierarchical processing method for video and audio data suitable for use, for example, to insert a commercial image (CM) between a plurality of broadcasting programs to be broadcast.

A CM insertion apparatus is conventionally available which inserts a video clip (hereinafter referred to simply as clip), for example, for a CM between a plurality of broadcasting programs to be broadcast. The CM insertion apparatus compresses audio/video data in accordance with the MPEG (Moving Picture Experts Group) standards to encode a video source of a clip, stores the compressed audio/video data onto a hard disk once, and edits the broadcasting order, broadcasting times and so forth of broadcasting programs and clips to make a program so that a plurality of broadcasting programs and clips may be successively sent out. In actual broadcasting, the broadcasting programs and the clips are switched by a switcher and sent out in accordance with the edited program.

In such a CM insertion apparatus as described above, in order to combine a plurality of clips, information such as, for example, information of broadcasting dates (on air dates) and information of contents of the clips is required. In order to acquire such information, the clips must be reproduced using a monitor to confirm the contents of them once. Therefore, the CM insertion apparatus has a problem in that much time is required for confirmation of contents of clips.

SUMMARY OF THE INVENTION

It is an object of the present invention to provide a hierarchical processing apparatus and a hierarchical processing method for video and audio data by which program editing can be performed readily.

In order to attain the object described above, according to an aspect of the present invention, there is provided a hierarchical processing apparatus for video and audio data, comprising an image of a first hierarchy for displaying a plurality of playlists formed from a plurality of clips which are video and audio data and additional information corresponding to the clips in a list and selecting one of the playlists to determine a playlist of an object of modification or a playlist of an object of deletion, and an image of a second hierarchy for selecting one of the plurality of clips and adding, to the selected clip, corresponding additional information to produce or modify the playlist, wherein the image of the first hierarchy and the image of the second hierarchy allow transition therebetween and allow reproduction of the video and audio data of a clip included in the selected playlist at any time.

Preferably, the hierarchical processing apparatus has a retrieving function of retrieving, when one of the clips is to be selected, a desired clip by inputting information for specifying the clip.

Preferably, the image of the first hierarchy and the image of the second hierarchy are graphical user interfaces.

Preferably, the image of the first hierarchy has a function of designating a sort key for determining an order in which the playlists are to be displayed in a list.

Preferably, when video and audio data of a clip included in the selected playlist are reproduced, a mark is displayed which indicates which one of the plurality of clips included in the playlist is reproduced.

When a clip is to be selected from within a list of a plurality of clips formed from video and audio data, the clip may be selected using a mouse, or a clip ID may be inputted from a keyboard.

Preferably, when a clip is to be selected from within a list of a plurality of clips formed from video and audio data, a method of selecting the clip using a mouse and another method of inputting a clip ID from a keyboard can be selected alternatively.

Preferably, a plurality of ones of the playlists can be selected and deleted at a time.

A server in which the video and audio data of the clips are recorded may be connected to the hierarchical processing apparatus and output the video and audio data of the clips based on the playlists.

According to another aspect of the present invention, there is provided a hierarchical processing method for video and audio data, comprising the steps of (a) displaying a plurality of playlists formed from a plurality of clips which are video and audio data and additional information corresponding to the clips in a list, (b) selecting one of the playlists, (c) determining that the selected playlist should be modified, (d) selecting one of the plurality of clips, (e) adding additional information to the selected clip and adding the clip to the playlist or modifying additional information to the selected clip or else deleting the selected clip, and (f) reproducing the video and audio data of a clip included in the playlist when required.

Preferably, detailed contents of the playlist which is determined to be modified in the step (c) are displayed.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 12 is a diagrammatic view showing a playlist image;

FIG. 13 is a diagrammatic view showing a detailed construction of an edit playlist image;

FIG. 16 is a diagrammatic view showing a playlist table image;

DESCRIPTION OF THE PREFERRED EMBODIMENT

1. General Construction of the Television Broadcasting System

Figure 1:
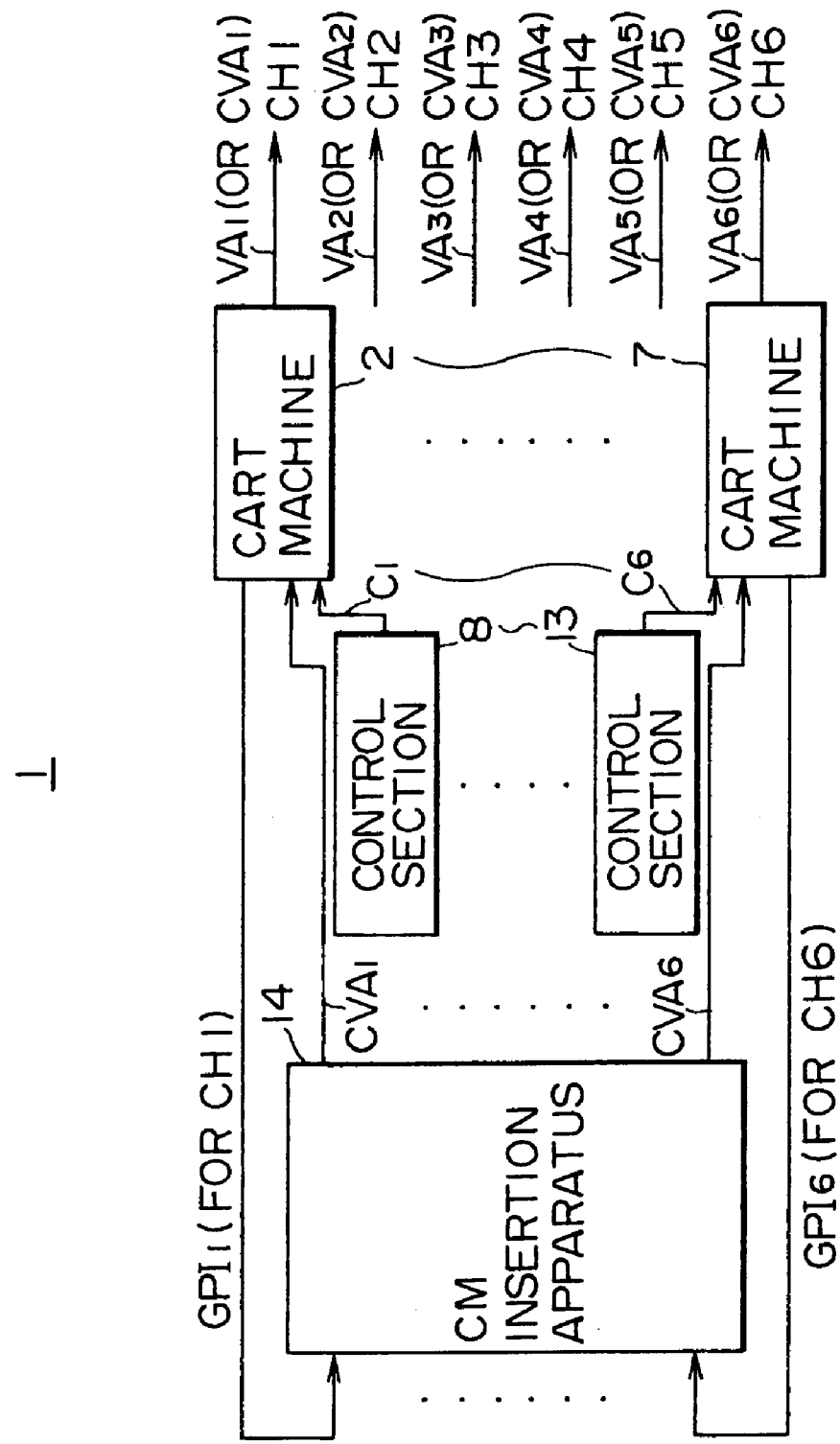
FIG. 1 is a schematic block diagram showing a general construction of a television broadcasting system to which the present invention is applied.

Referring first to FIG. 1, there is shown a general construction of a television broadcasting system for a CATV (cable television) to which the present invention is applied. The television broadcasting system is generally denoted at 1 and includes a plurality of cart machines 2 to 7 corresponding to required channels (6 channels in the arrangement shown in FIG. 1), a plurality of control sections 8 to 13 provided corresponding to the cart machines 2 to 7, respectively, and a commercial image (CM) insertion apparatus 14.

The control sections 8 to 13 supply control signals C1 to C6 to the cart machines 2 to 7 in accordance with broadcasting programming programs inputted thereto in advance, respectively.

Each of the cart machines 2 to 7 reproduces, in response to a corresponding one of the control signals C1 to C6 supplied thereto from the control sections 8 to 13, respectively, within a program broadcasting time, a corresponding one of video/audio data VA1 to VA6 of a designated broadcasting program from a designated video tape, and outputs the reproduced video/audio data from a corresponding channel via a switcher built in the cart machine.

When a time prior by one to two seconds to a planned CM insertion starting time comes, each of the cart machines 2 to 7 supplies a corresponding one of timing signals GPI1 to GPI6 to the CM insertion apparatus 14. Consequently, CM video/audio data CVA1 to CVA6 based on CM sending-out program lists (hereinafter referred to as playlists) set in advance for the individual channels are successively reproduced beginning with individual starting times and sent out to the outside via a switcher by the CM insertion apparatus 14.

The cart machines 2 to 7 manage also starting times of the video/audio data VA1 to VA6 of next broadcasting programs upon completion of sending-out of the CM video/audio data CVA1 to CVA6 so that the switchers may be switched at timings at which the CM video/audio data CVA1 to CVA6 come to an end to output video/audio data VA1 to VA6 of the next broadcasting programs.

In this manner, the television broadcasting system 1 successively switches the video/audio data VA1 to VA6 and the CM video/audio data CVA1 to CVA6 to successively send out them in accordance with the broadcasting programming programs set in advance for the individual channels by the cart machines 2 to 7 so that commercial images based on playlists may be broadcast between different broadcasting programs.

2. Construction of the CM Insertion Apparatus

Figure 2:
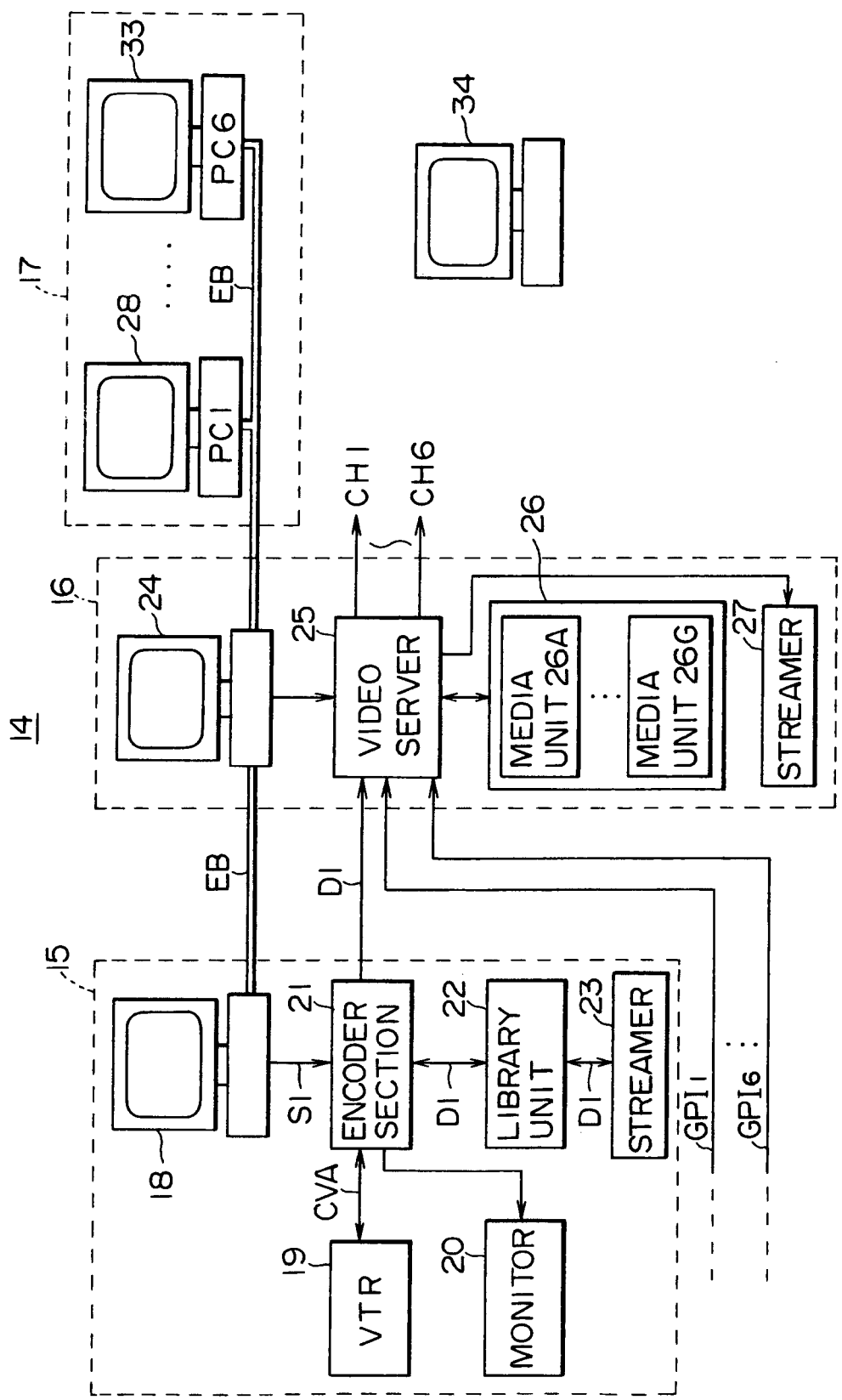
FIG. 2 is a block diagram showing a detailed construction of a CM insertion apparatus of the television broadcasting system of FIG. 1.

Referring now to FIG. 2, there is shown a detailed construction of the CM insertion apparatus 14. The CM insertion apparatus 14 shown includes an encoding processing section 15 for encoding CM video/audio data CVA1 to CVA6 in accordance with the MPEG (Moving Picture Experts Group) standards, multiplexing the encoded CM video/audio data CVA1 to CVA6 to produce encode data D1 and outputting the encode data D1, a playout section 16 for recording and storing the encode data D1 and reproducing and outputting the encode data D1 in accordance with playlists set in advance for the individual channels, and a monitoring section 17 for monitoring sending-out conditions of the CM video/audio data CVA1 to CVA6 and performing production, reproduction and editing of a playlist when necessary.

The encoding processing section 15, playout section 16 and monitoring section 17 are connected to a network by an Ethernet bus EB.

In the encoding processing section 15, CM video/audio data CVA recorded on a video tape by a VTR 19 are encoded and then decoded by an encoding section 21 under the control of a computer 18, and while the thus decoded CM video/audio data CVA are monitored actually by a monitor 20, a broadcasting time range of a CM video/audio data CvA to be encoded is designated in units of "second" using a time code. Meanwhile, the encoded CM video/audio data CVA is recorded on a recording member such as a library unit 22 or a streamer 23.

The computer 18 supplies an instruction signal S1 for encoding a CM video/audio data CVA in the designated broadcasting time range to the encoding section 21.

The encoding section 21 encodes the CM video/audio data CVA in the designated broadcasting time range in accordance with the MPEG standards in response to the instruction signal S1.

Actually, the encoding section 21 applies an ID number called "clip ID" to each of the CM video/audio data CVA included in the designated time range to produce an "encode list" which includes a plurality of clip IDs.

Then, the encoding section 21 encodes the clip IDs collectively based on the "encode list", and stores the encoded clip IDs as encode data D1 onto the library unit (hard disk) 22 and sends out the encoded clip IDs at a transfer rate of 10 Mbps also to a video server 25 of the playout section 16.

In this instance, the encoding processing section 15 controls the monitor 20 so that the monitor 20 may display image conditions of the encoded clip IDs thereon. Consequently, an operator can confirm the image conditions of the encoded clip IDs displayed on the monitor 20.

The computer 18 reads out the encode data D1 stored on the library unit 22 and sends out the encode data D1 to the streamer 23 so as to be recorded by the streamer 23. Consequently, with the CM insertion apparatus 14, a streamer tape on which the encode data D1 have been recorded by the encoding processing section 15 can be carried so that the encode data D1 can be read out by a streamer 27 of the playout section 16 provided at a remote location.

Meanwhile, in the playout section 16, a computer 24 stores the encode data D1 sent thereto from the encoding section 21 of the encoding processing section 15 onto a designated one of media units 26 (media units 26A to 26G) via the video server 25 in response to a control signal received via the Ethernet from the computer 18 of the encoding processing section 15.

The streamer 27 can read out the encode data D1 also by reproducing a streamer tape recorded by the streamer 23 of the encoding processing section 15.

Further, the playout section 16 can produce "playlists" which are CM sending-out program lists based on additional information (ID No., Title and so forth) of the clip IDS of the encode data D1 stored on the media units 26A to 26G and record and reproduce the playlists onto and from a hard disk in the computer 24. Further, the playout section 16 can edit the playlists when required.

The video server 25 successively decodes, when the timing signals GPI1 to GPI6 corresponding to the channels are received from the cart machines 2 to 7, respectively, the clip IDs in accordance with the order programmed in the "playlists" and outputs the CM video/audio data CVA1 to CVA6 in the programmed order at timings at which broadcasting programs come to an end from the designated channels via the cart machines 2 to 7 (FIG. 1), respectively.

Meanwhile, the monitoring section 17 has monitoring computers 28 to 33 so that contents of the "playlists" (CM sending-out program lists) of the CM video/audio data CVA1 to CVA6 sent out corresponding to the channels from the video server 25 may be confirmed on computer screens.

Thus, in the monitoring section 17, exclusive operators are disposed for the computers 28 to 33 so that they may monitor broadcasting situations of the CM video/audio data CVA1 to CVA6 for the individual channels.

Further, as an initial state when the monitoring computers 28 to 33 are started, the playlists of the "1" to "6" channels are allocated in order to the computers 28 to 33. However, switches can be switched so that contents of the "playlist" of a desired channel may be displayed on an arbitrary one of the computers 28 to 33.

Furthermore, the monitoring computers 28 to 33 have same functions as those of the computer 24 of the playout section 16 and can effect editing of a playlist, replacement of a clip ID during reproduction of a playlist and so forth.

The CM insertion apparatus 14 further includes a playlist producing computer 34 for off-line production and editing of a playlist.

The playlist producing computer 34 has a function of effecting operations for production and editing of a playlist and can record a produced playlist onto a floppy disk.

Accordingly, the computer 24 of the playout section 16 can read out the playlist recorded on the floppy disk and output any of CM video/audio data CVA1 to CVA6 from the video server 25 in accordance with the playlist.

Figure 3:
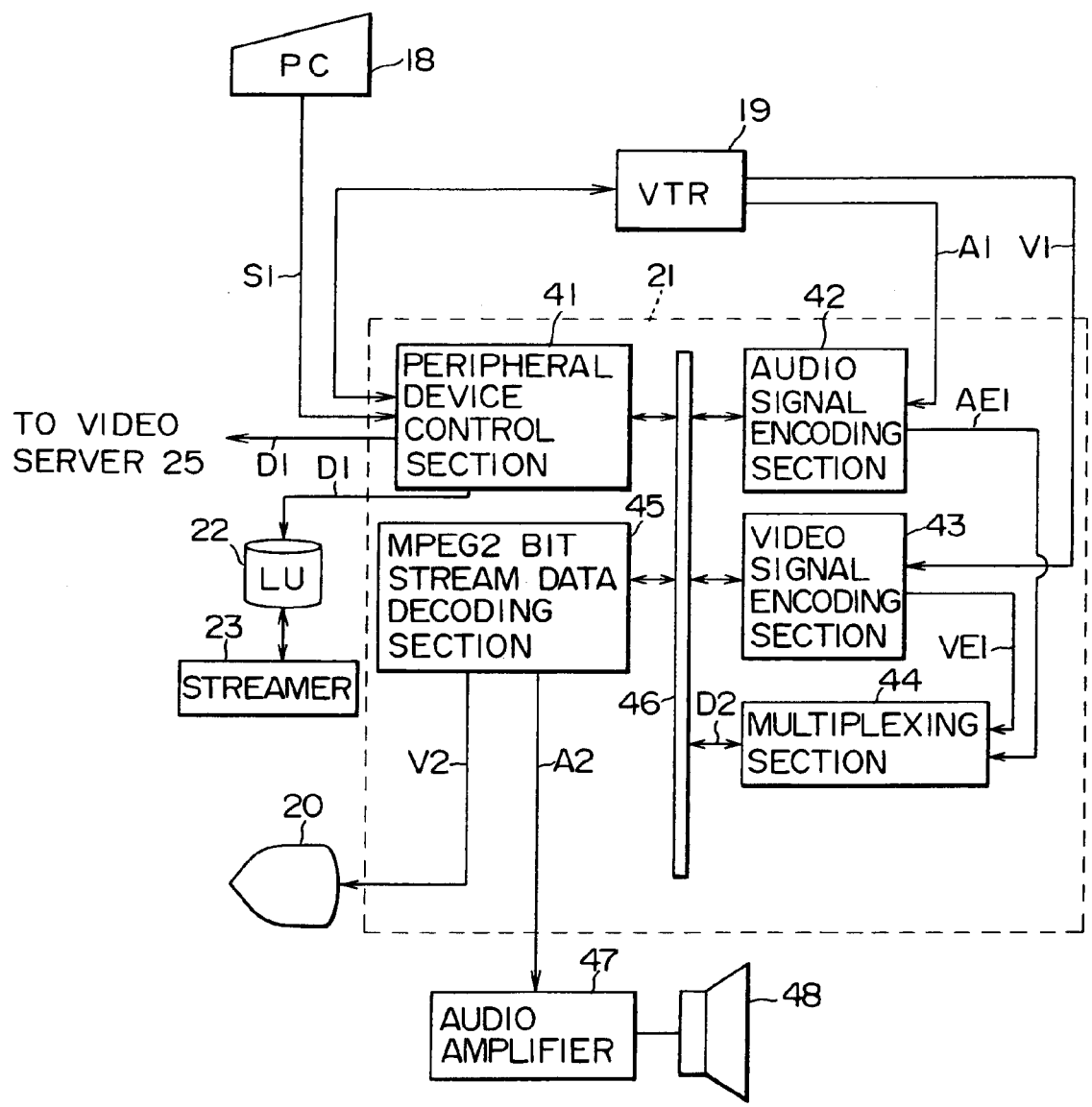
FIG. 3 is a block diagram showing a detailed construction of an encoder section of an encoding processing section of the CM insertion apparatus.

Alternatively, the playlist produced by the playlist producing computer 34 may be conveyed by a public network, a network for an electronic mail or the like without being recorded onto a floppy disk 2-1. Construction of the Encoding Processing Section Referring now to FIG. 3, there is shown a detailed construction of the encoding section 21 of the encoding processing section 15 described above. The encoding section 21 shown includes a peripheral device control section 41, an audio data encoding section 42, a video data encoding section 43, a multiplexing section 44, an MPEG2 bit stream data decoding section 45 and a system bus 46 which interconnects the components of the encoding section 21.

The peripheral device control section 41 reproduces CM video/audio data within a broadcasting time range designated by a time code in response to an instruction signal S1 from the computer 18 using the VTR 19, and supplies audio data A1 to the audio data encoding section 42 and supplies video data V1 to the video data encoding section 43.

Further, the peripheral device control section 41 controls the audio data encoding section 42, video data encoding section 43, multiplexing section 44 and MPEG2 bit stream data decoding section 45. Consequently, the audio data encoding section 42 encodes the audio data A1 into coded audio data AE1 conforming to the MPEG1 standards, Layer2 while the video data encoding section 43 encodes the video data V1 into coded video data VE1 conforming to the MPEG2 standards, MP@ML. The coded audio data AE1 and the coded video data VE1 are supplied to the multiplexing section 44.

The multiplexing section 44 multiplexes the coded audio data AE1 and the coded video data VE1 to produce bit stream data D2. The peripheral device control section 41 sends out the bit stream data D2 to the MPEG2 bit stream data decoding section 45 through the system bus 46.

Further, the peripheral device control section 41 sends out the bit stream data D2 to the video server 25 so that the bit stream data D2 may be stored onto the media units 26A to 26G through the video server 25.

Furthermore, the peripheral device control section 41 stores the bit stream data D2 into the library unit 22 once. The bit stream data D2 stored in the library unit 22 can be recorded onto a streamer tape by the streamer 23.

The MPEG2 bit stream data decoding section 45 decodes, under the control of the peripheral device control section 41, the bit stream data D2 to extract CM video data V2 and CM audio data A2. The CM video data V2 is outputted to the image conforming monitor 20 while the CM audio data A2 is outputted to and amplified by an audio amplifier 47 so that the CM audio data A2 may be outputted as sound from a loudspeaker 48.

Consequently, an operator can visually observe the CM video data V2 of the actually encoded clip ID on the monitor 20 and listen to sound outputted from the loudspeaker 48 to check the picture quality and the sound quality of the encoded clip ID.

Figure 4:
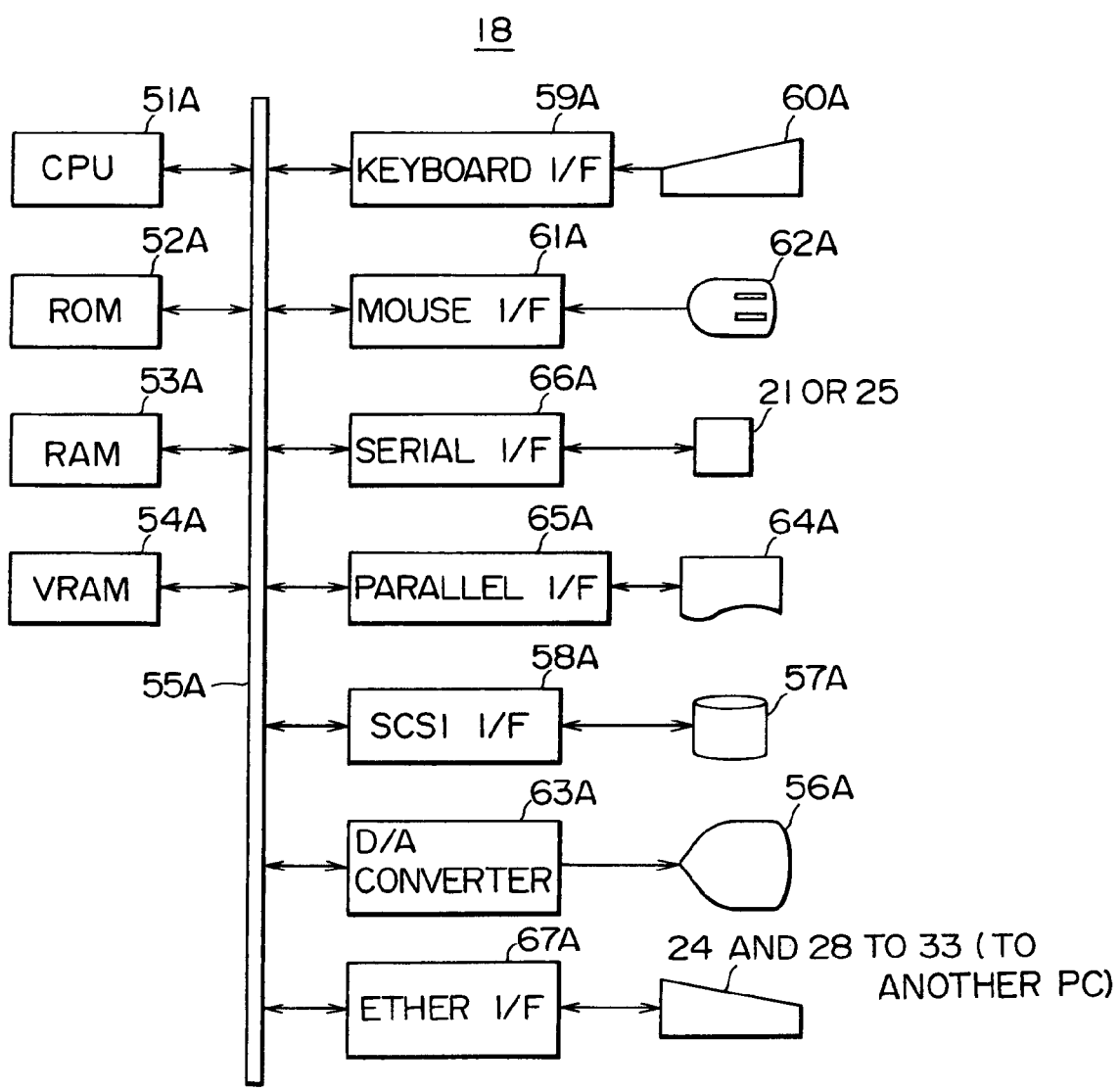
FIG. 4 is a block diagram showing a detailed construction of a computer of the encoding processing section.

Referring now to FIG. 4, there is shown a detailed construction of the computer 18 of the encoding processing section 15. The computer 18 shown includes a central processing unit (CPU) 51A which serves as a control section of the computer, a read only memory (ROM) 52A and a random access memory (RAM) 53A which serve as main memories, a video random access memory (VRAM) 54A serving as a memory for an image display, and a system bus 55A interconnecting the components of the computer 18.

Further, peripheral equipments such as inputting and output apparatus and an external storage apparatus are connected to the CPU 51A and the main memories by the system bus 55A.

The ROM 52A stores a basic input/output system (BIOS) which is a basic operation program for initializing the system of hardware when the computer 18 is to be started. The RAM 53A is used as a working area of the CPU 51A for an operating system (OS) and execution programs of application software. Further, the VRAM 54A is used as a memory for writing image display data to be displayed on a screen of a monitor 56A provided for the computer 18.

If the power supply is made available to start the computer 18 with the BIOS read out from the ROM 52A, then the CPU 51A reads out the OS from a hard disk 57A via a SCSI interface 58A and loads the OS into the RAM 53A. Consequently, the computer 18 is enabled to operate under the control of the CPU 51A with the OS.

When CM video/audio data are to be encoded, the CPU 51A reads out encoding control software for execution of various processes for encoding from the hard disk 57A through the SCSI interface 58A, loads the encoding control software into the RAM 53A and writes image display data of the encoding control software into the VRAM 54A by way of the OS.

The computer 18 writes, using the encoding control software, a menu screen image to be used when various processes in encoding processing are executed or image display data such as a text inputted from a keyboard 60A into the VRAM 54A by way of the OS. Then, the image display data are periodically read out by the CPU 51A and displayed on the screen.

In this instance, the computer 18 inputs input information inputted from the keyboard 60A or a mouse 62A serving as an inputting apparatus via a keyboard interface 59A or a mouse interface 61A and delivers the input information to the encoding control software by way of the OS.

Here, in order to display a menu screen image or a work screen image regarding encoding processing on the CRT monitor 56A, the image display data are read out from the VRAM 54A and sent out to a digital/analog (D/A) converter 63A under the control of the CPU 51A so that the digital video data are converted into analog video data by the D/A converter 63A and outputted to the CRT monitor 56A.

Further, a printer 64A is connected to the computer 18 by a parallel interface 65A and the bus 55A so that contents of a display image displayed on the CRT monitor 56A may be printed out using the printer 64A.

Furthermore, the computer 24 of the playout section 16 and the computers 28 to 33 of the monitoring section 17 are connected to the computer 18 of the encoding processing section 15 by the Ethernet bus EB and an Ethernet interface 67A. Consequently, communication of commands and data can be performed among the computer 18 of the encoding processing section 15, the computer 24 of the playout section 16 and the computers 28 to 33 of the monitoring section 17.

In this instance, the video server 25 of the playout section 16 is connected to the encoding section 21 of the encoding processing section 15 by the Ethernet so that various commands for processing by the encoding control software can be communicated between the encoding section 21 and the video server 25.

2-2. Construction of the Layout Section

Figure 5:
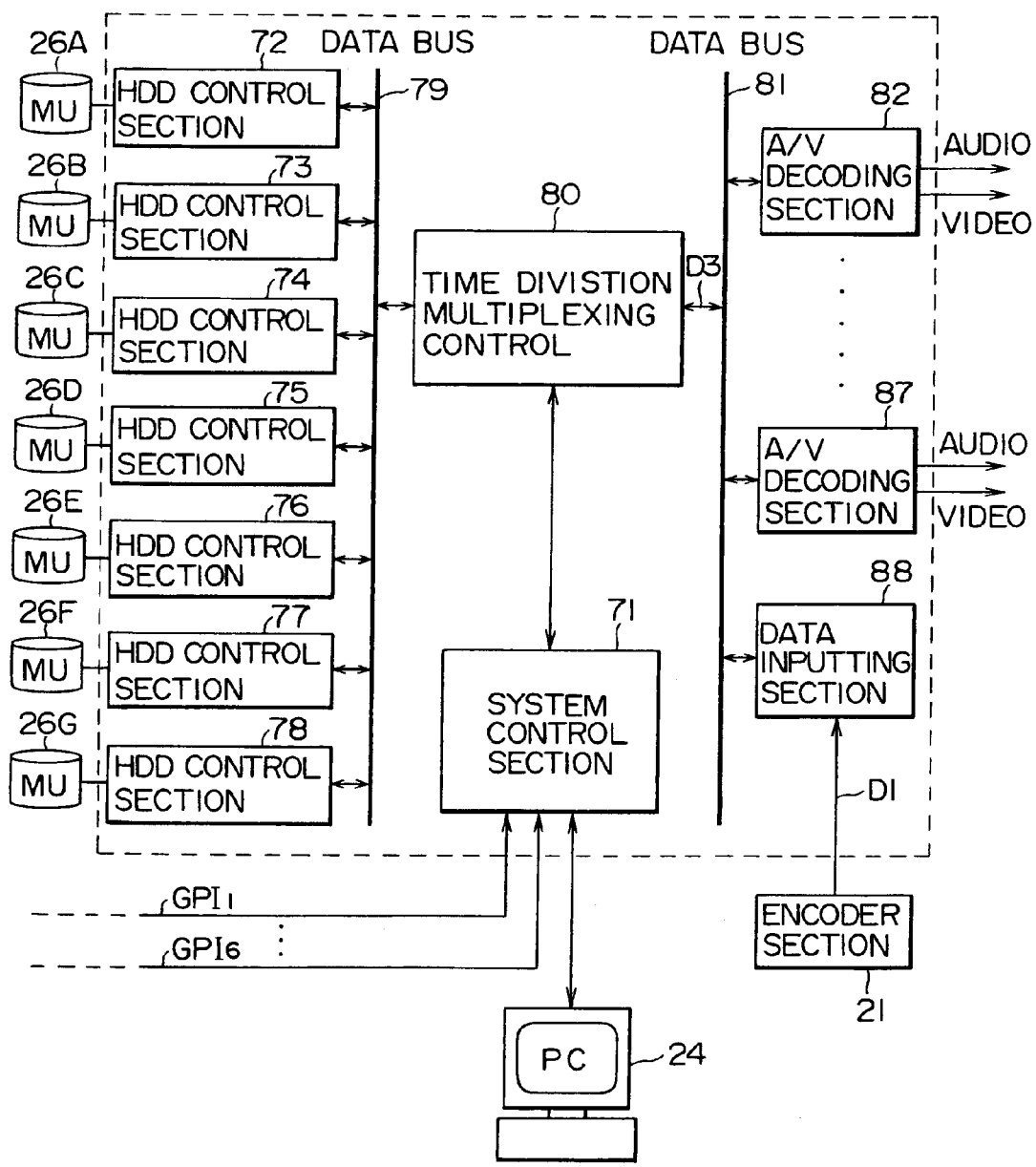
FIG. 5 is a block diagram showing a detailed construction of a video server of a playout section of the CM insertion apparatus.

Referring now to FIG. 5, there is shown a detailed construction of the video server 25 of the playout section 16. The video server 25 includes a system control section 71 which receives a command from the computer 24 and executes production, editing and reproduction of a playlist in response to the command.

The system control section 71 controls the entire video server 25. In particular, the system control section 71 controls HDD control sections 72 to 78 in response to timing signals GPI1 to GPI6 sent out thereto from the cart machines 2 to 7 to read out encode data stored in the media units 26A to 26G, respectively, and sends out the encode data to a time division multiplexing control section 80 through a data bus 79.

The time division multiplexing control section 80 time division multiplexes the encode data to produce bit stream data D3 and sends out the bit stream data D3 to A/V decoding sections 82 to 87 corresponding to the individual channels through a data bus 81.

The A/V decoding sections 82 to 87 decode the bit stream data D3 and output them as analog CM video and audio data CVA1 to CVA6, respectively.

A data inputting section 88 inputs encode data D1 sent thereto from the encoding section 21 of the encoding processing section 15 and sends out the encode data D1 to the A/V decoding sections 82 to 87. Consequently, the A/V decoding sections 82 to 87 decode the encode data D1 and output them as analog CM video and audio data CVA1 to CVA6, respectively.

Figure 6:
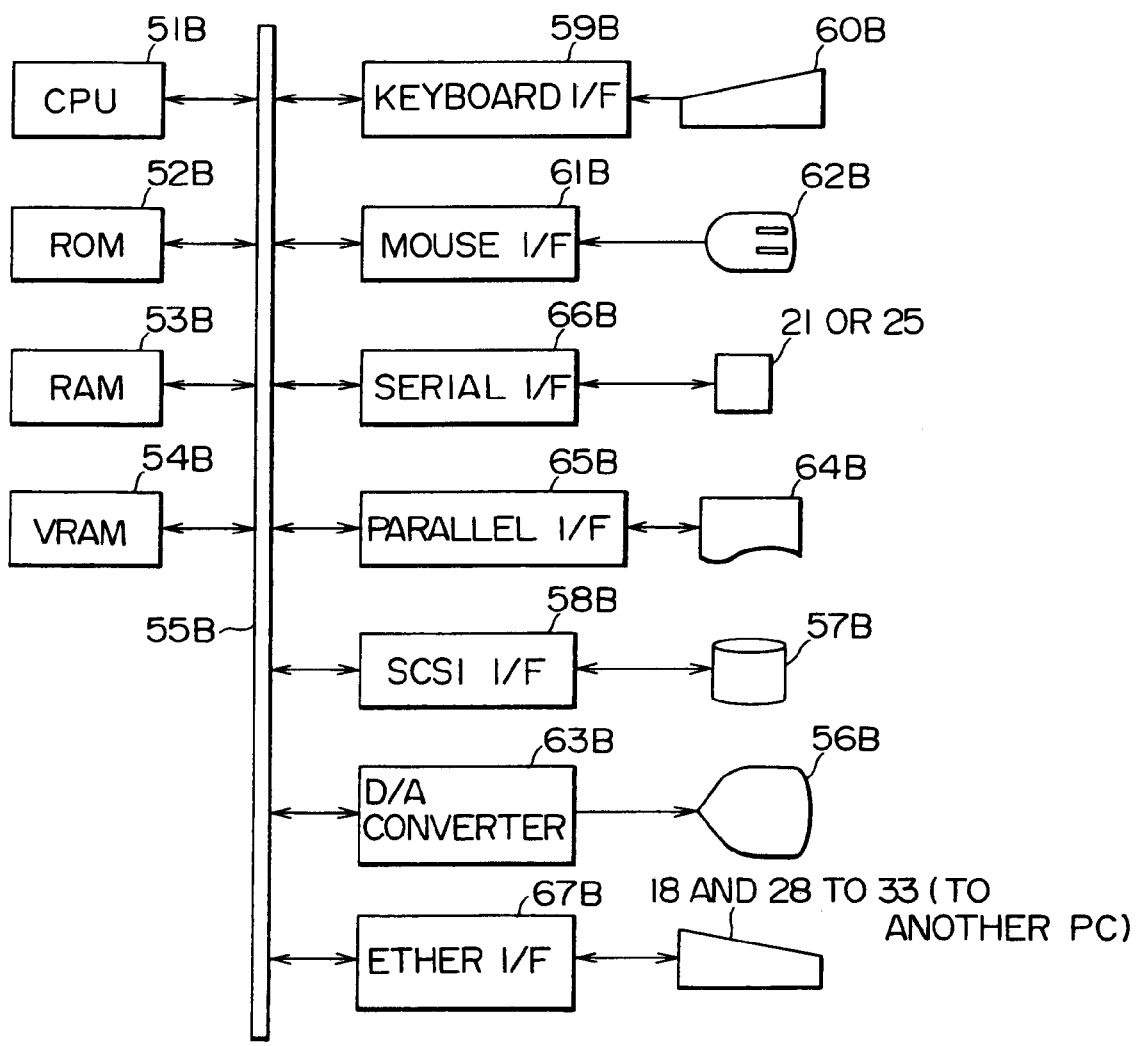
FIG. 6 is a block diagram showing a detailed construction of a computer of the playout section of the CM insertion apparatus.

FIG. 6 shows a detailed construction of the computer 24 of the playout section 16. In FIG. 6, like elements to those of FIG. 4 are denoted by like reference numerals with the suffix "B" added thereto. Referring to FIG. 6, the computer 24 of the playout section 16 is constructed in a similar manner to that of the computer 18 except that playout control software different from the encoding control software recorded on the hard disk 57A of the computer 18 is stored on a hard disk 57B and that the computer 24 is connected to the computer 18 of the encoding processing section 15 and the computers 28 to 33 of the monitoring section 17 via an Ethernet interface 67B.

The playout control software is used to execute various processes including production, editing and reproduction of a playlist, and the computer 24 can execute various processes based on the playout control software.

2-3. Construction of the Monitoring Section

Figure 7:
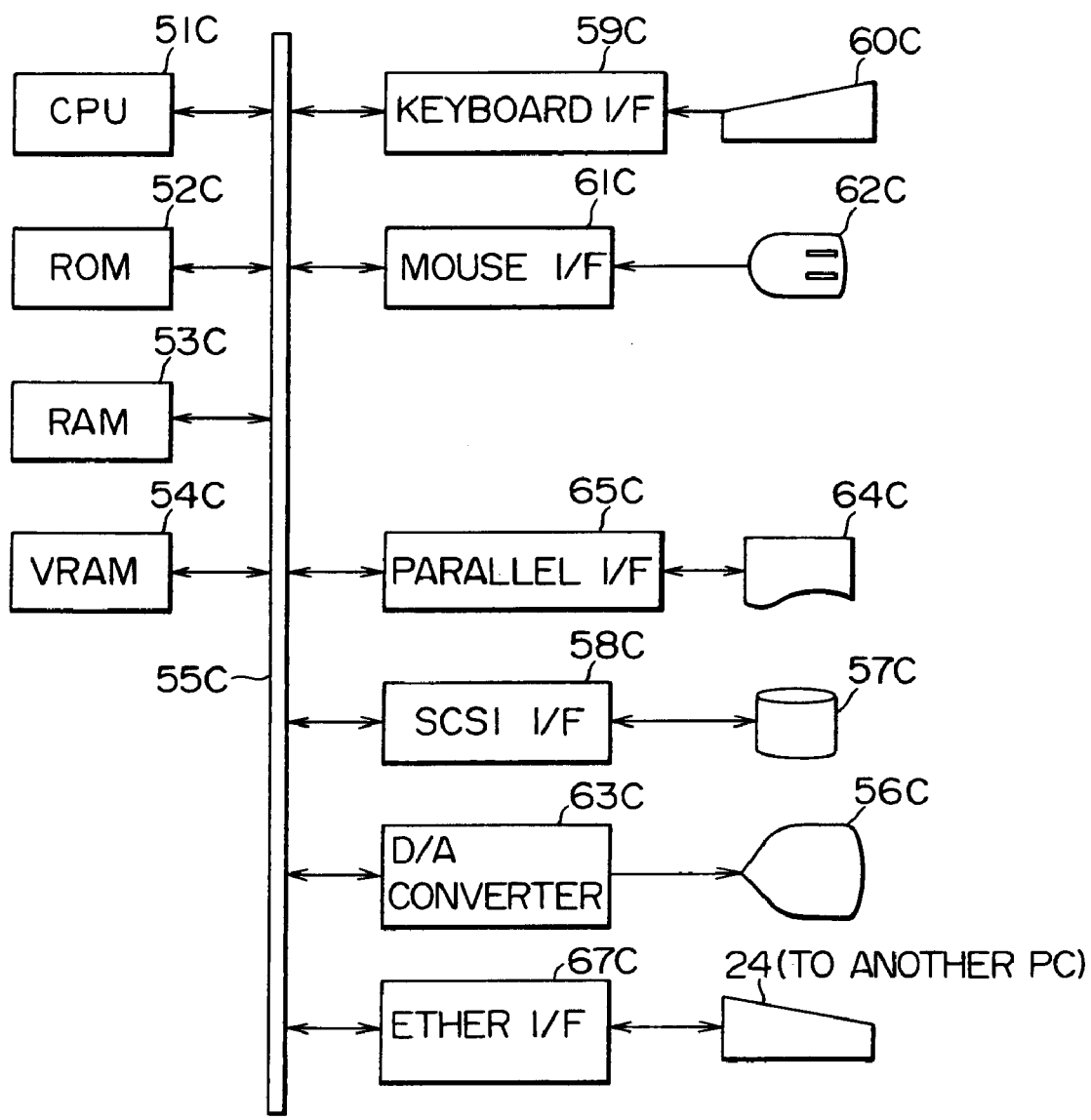
FIG. 7 is a block diagram showing a detailed construction of a computer of a monitoring section of the CM insertion apparatus.

Referring now to FIG. 7, there is shown a detailed construction of the computers 28 to 33 of the monitoring section 17. In FIG. 7, like element to those of FIG. 4 are denoted by like reference numerals with the suffix "C" added thereto. The computers 28 to 33 of the monitoring section 17 are constructed in a similar manner to that of the computer 18 except that layout monitoring software different from the encoding control software recorded on the hard disk 57A of the computer 18 is stored on a hard disk 57C, that the computers 28 to 33 are connected to the computer 24 of the playout section 16 through an Ethernet interface 67C, and the computers 28 to 33 do not have a serial interface 66B and are connected only to the computer 24.

The playout monitoring software is a program having quite equivalent functions to those of the layout control software and is used not only to monitor contents and a sending-out condition of a play list on a CRT monitor 56C but also to perform an editing operation such as to modify a clip ID of the play list or replace a clip ID and reproduction of a playlist.

While the computers 28 to 33 have similar functions to those of the computer 18 in this manner, it is set that the functions of the computer 18 normally have priority. Accordingly, the computers 28 to 33 can execute production, reproduction and editing of a playlist only when the authority that the functions of the computers 28 to 33 have priority is given by the computer 18 in response to a manual operation of an operator.

2-4. Construction of the Playlist Producing Computer

Figure 8:
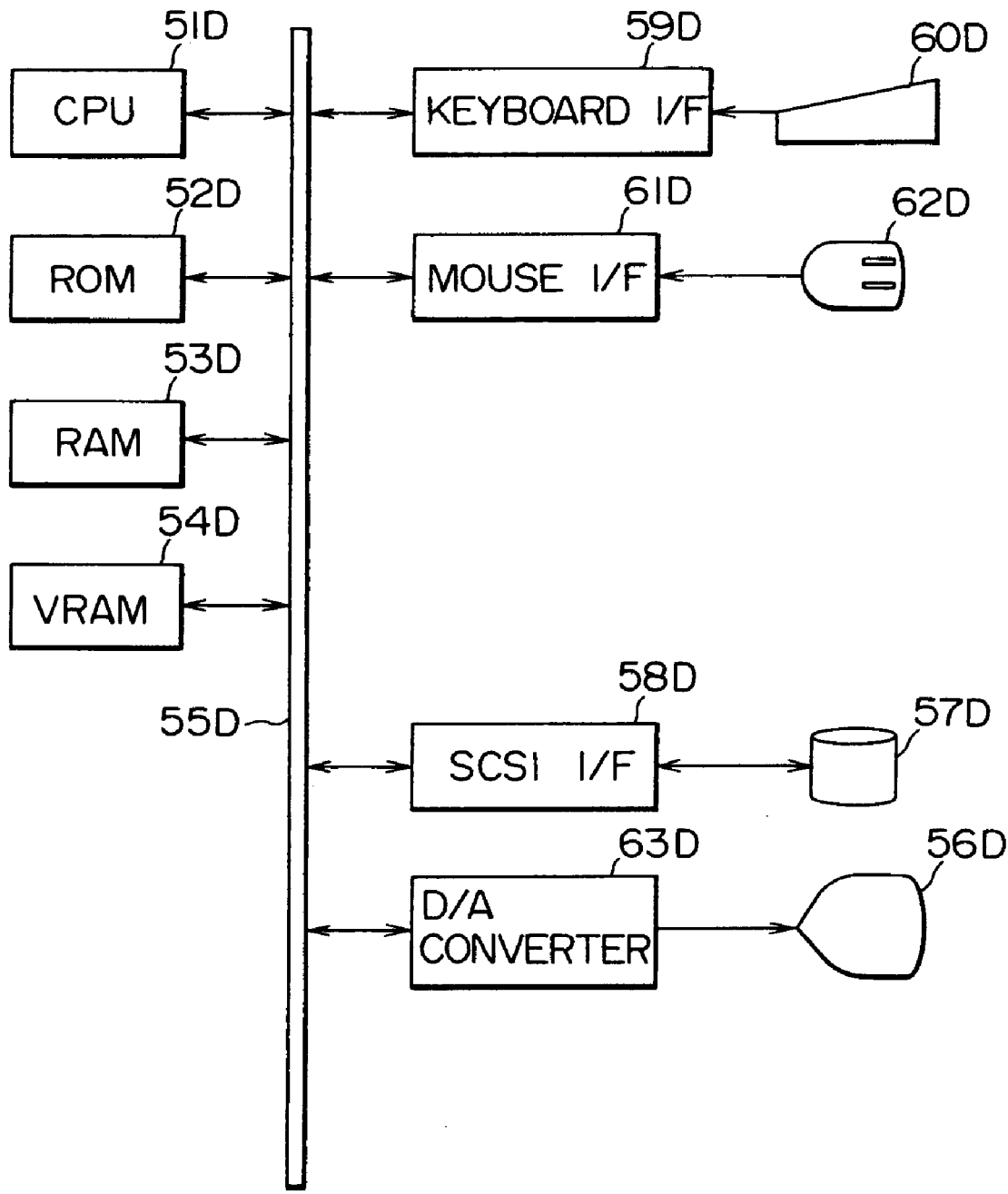
FIG. 8 is a block diagram showing a detailed construction of a playlist producing computer of the CM insertion apparatus.

Referring now to FIG. 8, there is shown a detailed construction of the playlist producing computer 34. In FIG. 8, like elements to those of FIG. 4 are denoted by like reference numerals with the suffix "D" added thereto. The playlist producing computer 34 shown is constructed in a similar manner to that of the computer 18 except that playlist creation software different from the encoding control software recorded on the hard disk 57A of the computer 18 is recorded on a hard disk 57D, that the playlist producing computer 34 does not have a serial interface or a parallel interface, and that the playlist producing computer 34 does not have an Ethernet interface and is not connected to any other computer.

The playlist creation software is a program having a function of production and editing of a playlist and is used to record a playlist produced by the playlist producing computer 34 onto a floppy disk or the like and read out the recorded playlist data by any of the computers 24 and 28 to 33.

3. Playout Control 3-1. Construction of the Playout Section

In the playout section 16, encode data sent out from the encoding processing section 15 are stored once onto a storage apparatus such as the media units 26, and the encode data are edited in accordance with a program (hereinafter referred to as playout control program) of the playout control software by the computer 24, and then a file of playlists programmed so as to successively output a clip file and a plurality of clips is produced and outputted through channels CH1 to CH6 from the video server 25.

Figure 9:
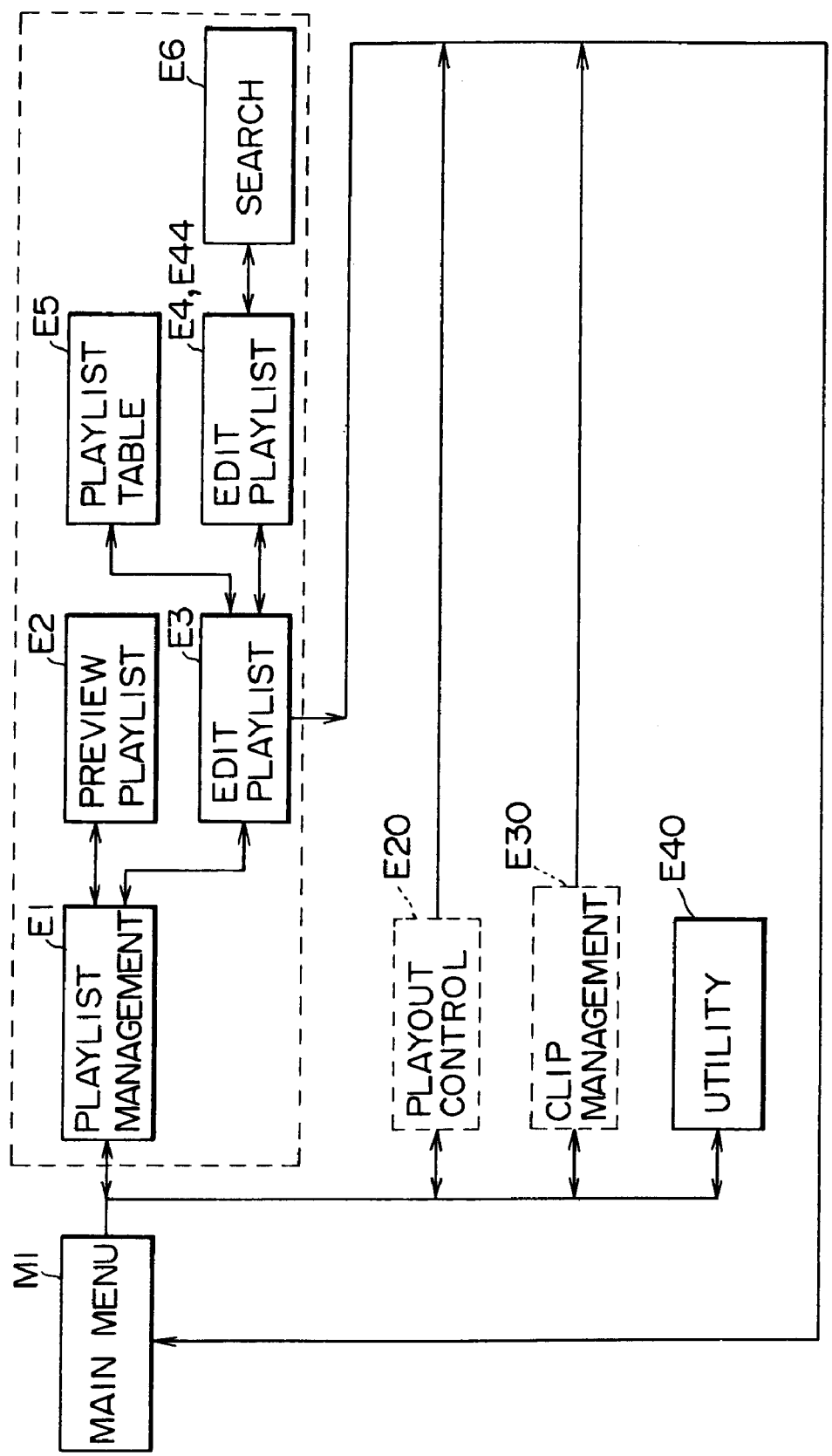
FIG. 9 is a flow diagram showing a detailed construction of a playlist management image.

In particular, the computer 24 of the playout section 16 displays, by CPU control in accordance with the playout control program, a menu screen image (M1), work screen images for playlist management (E1 to E5), a work screen image E20 for playout control, a work screen image E30 for clip management and a work screen image E40 for utility in a flow shown by FIG. 9.

An operator will observe the menu screen image (M1) and the work screen images (E1 to E4) and input, modify or delete information such as clip IDs, broadcasting times and so forth regarding clips to produce a playlist which is a program for successively sending-out clips. Further, a plurality of playlists are managed by modifying or deleting them on a work screen image (E5 or E44).

3-2. Image Configuration for Playlist Management

Figure 10:
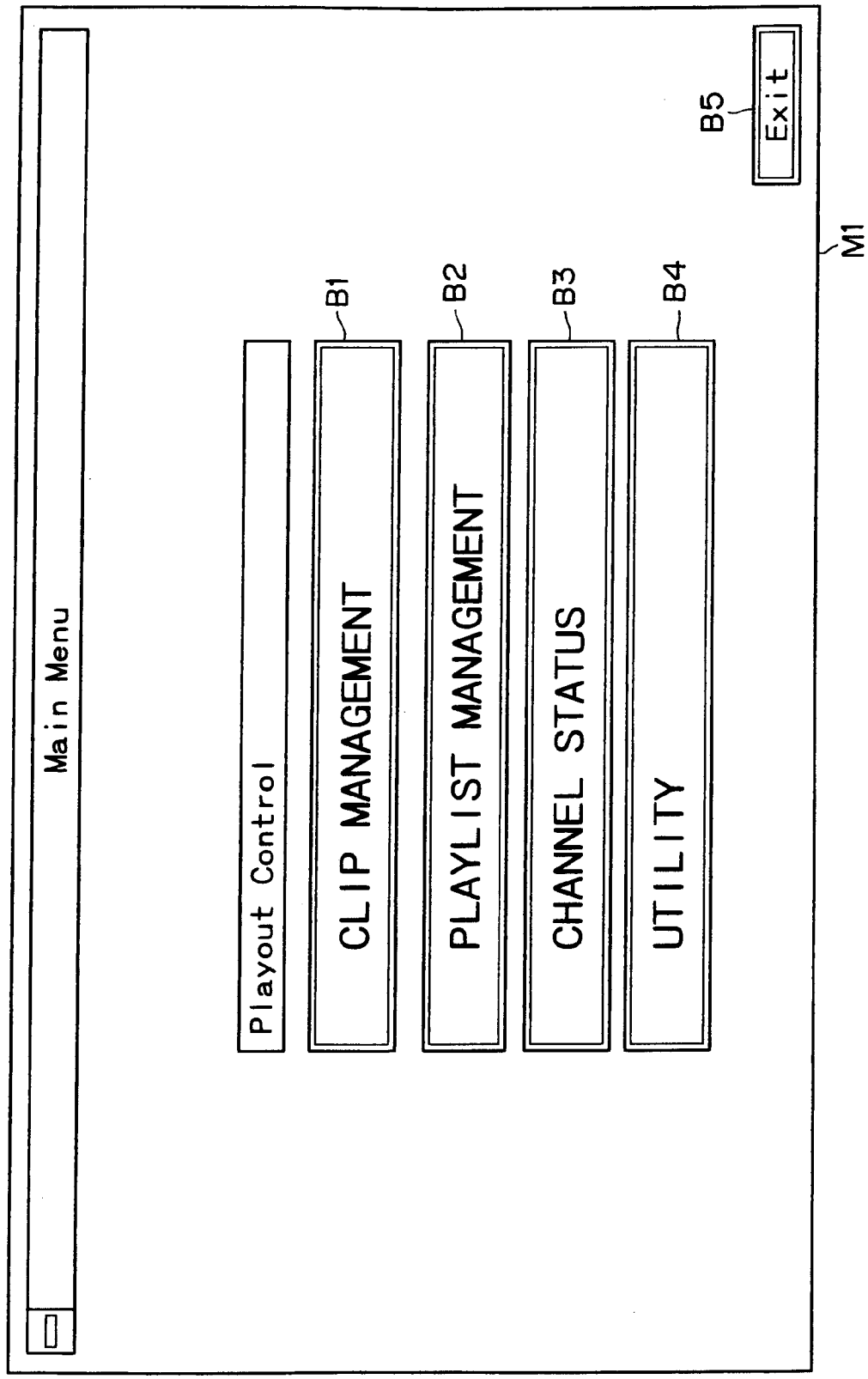
FIG. 10 is a diagrammatic view showing a main menu screen image by playout control software displayed on a CRT monitor.

Here, the playout control program causes, upon playout control, such a menu screen image M1 as seen in FIG. 10 and a plurality of work screen images E1 to E6, E20, E30, E40 and E44 to be displayed on the screen of a CRT monitor 56D. The image configuration is such that the menu screen image M1 is located at the top, and the work screen image E1 for playlist management is located as a lower level work screen image below the menu screen image M1 while the work screen image E2 for preview playlist and the work screen image E3 for edit playlist belong to the lower level to the work screen image E1. Further, to the lower level to the work screen image E3, the work screen images E4 and E44 for edit playlist for a mouse and the work screen image E5 for playlist table belong. Further, the search work screen image E6 for retrieving clips with a clip ID or a keyword belongs to the lower level to the work screen images E4 and E44.

Referring to FIG. 10, the menu screen image M1 displayed on the monitor 56D includes a clip management "CLIP MANAGEMENT" selection button B1, a playlist management "PLAYLIST MANAGEMENT" selection button B2, a channel status "CHANNEL STATUS" selection button B3, a selection button B4 for selecting a utility "UTILITY" and an exit ("Exit") button B5 for ending the display of the menu screen image M1.

The clip management is processing for managing clips which are encode data encoded by the encoding processing section 15 by setting starting times, ending times and so forth. The playlist management is processing for editing clips to create a playlist. The channel status is processing for monitoring states of playlists being outputted from the channels 1CH to 6CH through the video server 25 at present. The utility provides image processing regarding various utility functions of the playout control software.

Figure 11:
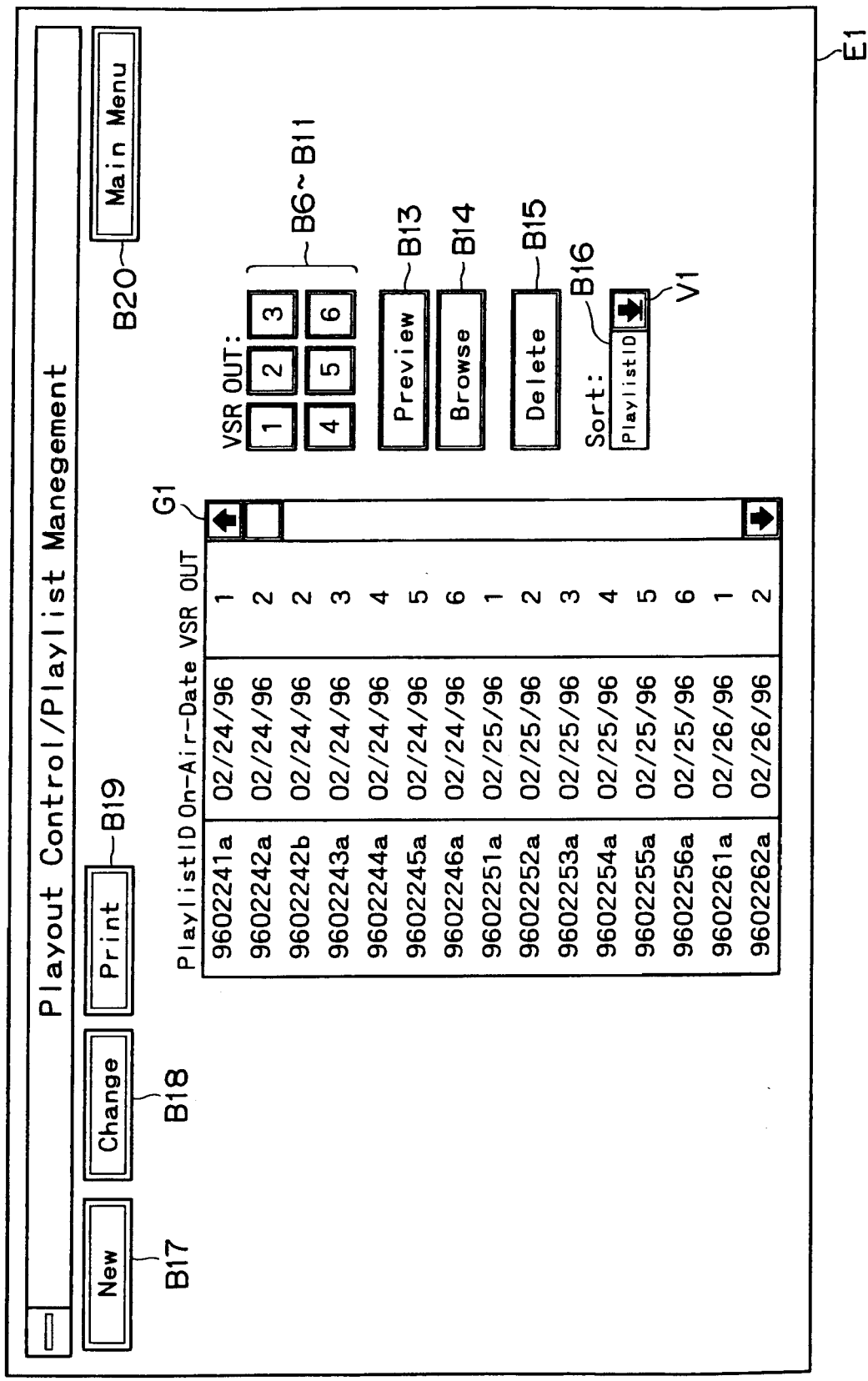
FIG. 11 is a diagrammatic view showing a playlist management image by playout control software displayed on the CRT monitor.

Here, if an operator selects the playlist management by manually operating the mouse 62D to click the button B2, then such a playlist management work screen image E on the hierarchically lower level to the menu screen image M1 as shown in FIG. 11 is displayed on the computer 24 under CPU control in accordance with the playlist control program.

The playlist management work screen image E1 has a work region G1 in which the items of the playlist ID "Playlist ID", on air date "On-Air-Date" and output channel "VSR OUT" are displayed, selection buttons B6 to B11 for setting the six output channels 1CH to 6CH (VSR OUT), respectively, a preview selection button B13 ("Preview"), a browse selection button B14 ("Browse") and a delete selection button B15 ("Delete").

The preview is an operation switch for causing, when an object play list in the work region G1 is selectively clicked by the mouse 62B, all of contents of the playlist to be outputted to the CRT monitor 56B. The browse is an operation switch for broadcasting the contents of the selected playlist, for example, for several seconds. Further, the delete is an operation switch for deleting the selected playlist.

The playlist management work screen image E1 includes, in addition to the buttons B6 to B15 described above, a sort selection button B16 ("Sort"), a new selection button B17 ("New"), a change selection button B18 ("change"), a print selection button B19 ("Print") and a main menu selection button B20 ("Main Menu").

The sort is provided to designate the sort key to display playlist IDs in the display window by clicking an arrow mark Y1 provided on the right side so that the sort key for a playlist ID to be displayed in the work region G1 can be selected.

The new is used to set processing for selection of production of a new playlist; the change is used to set processing for modification to contents of a designated playlist; the print is used to set processing for printing out of the designated playlist; and the main menu is used to set processing for restoring display of the menu screen image M1.

The buttons B6 to B20 provided on the work screen image E1 are caused to operate by clicking by the mouse 62B.

Here, new production or modification is set by selecting, in the playlist management work screen image E1, a playlist ID of an object playlist and selecting one of the buttons B17 and B18 from among the buttons B15, B17 and B18 by clicking. Here, if the operator selects a particular play list and an output channel (VSR OUT) by a manual operation of the mouse 62B and selecting the preview of the button B13, then such a playlist work screen image E1 as shown in FIG. 12 which is on the hierarchically lower level to the playlist management work screen image E1 is displayed on the monitor 56B, and details of the selected playlist are outputted. Simultaneously, an image/sound of the clip is displayed on the monitor.

Here, on the playlist work screen image E2, a display region F2 in which clip information including an event "Event" representative of order numbers applied to the clips, a start time "Start" representative of starting times according to the time codes of the clips, a total duration "Total Duration" representative of a totalling broadcasting time of a plurality of clips, a duration "Duration" representative of broadcasting times of the clips and a clip ID "Clip ID" representative of clip IDs is displayed, another display region F3 for an on air date "On-Air-Date", a further display region F4 for an output channel ("VSR OUT") and a still further display region F5 for a playlist ID ("PlaylistID") are displayed in an overlapping relationship on the work screen image E1.

Further, When the playlist display is to be stopped, the stop button B21 ("Stop") is clicked.

Further, when an existing playlist is to be modified, the operator will manually operate the mouse 62D on the work screen image E1 to position the cursor on the playlist ID of the object playlist and then click the button B18. Consequently, the object playlist is selected, and such an edit playlist work screen image E3 as shown in FIG. 13 is displayed on the monitor 56B so that contents of the object playlist can be modified using the work screen image E3.

Further, if new production of a playlist is selected by clicking the new "New" button B17 on the work screen image E1, then the work screen image E3 in an initial state for new production of a playlist, that is, a state in which individual items are blank, from the work screen image E1 is outputted and displayed. Further, by a manual inputting operation on the work screen image E3, attribute information such as a playlist ID, a broadcasting date of the playlist and an output channel is added to the playlist, and the resulting playlist can be displayed on the work screen image E1.

The edit playlist work screen image E3 displays work regions G2 to G10 for modification of a selected playlist or for production of a new playlist.

In particular, as clip information to be inputted newly, an event "Event" representative of an order number to be applied to a clip is inputted to the work region G2; a clip ID "Clip ID" is inputted to the work region G3; a start "Start" representative of a starting time of the clip is inputted to the work region G4; a description "Description" representative of a description regarding the clip is inputted to the work region G5; and a duration "Duration" representative of a broadcasting time of the clip is inputted to the work region G6.

Further, a broadcasting date "Date" is inputted to the work region G7; a playlist ID "PlaylistID" is inputted to the work region G8; and an output channel "VSR OUT" is inputted to the work region G9.

When a playlist is to be modified, clip information of the event, clip ID, title, description, total duration and duration regarding the selected playlist is displayed in a display region F10 in the lower area on the work screen image E3. Furthermore, information regarding the clip indicated by the cursor and clicked is displayed also in the work regions G2 to G9.

Furthermore, on the work screen image E3, a save button B22 ("Save") for storing a playlist newly produced or modified onto the hard disk 57B, a cancel button B24 ("Cancel") for stopping the display of the work screen image E3 and then displaying the work screen image E1, a print button B24 ("Print") for outputting a set playlist by printing, an edit mouse button B25 ("Edit(Mouse)") for changing the working environment to the edit playlist work screen image E4 for the mouse 62B, a playlist table button B26 ("Playlist Table") for causing the playlist table work screen image E5 to be displayed, a previous button B27 ("Previous") for restoring the display of the playlist management work screen image E1, a main menu button B28 ("Main Menu") for restoring the menu screen image M1 for the main menu, and a delete button B29 ("Delete") for deleting a playlist being displayed.

Figure 14:
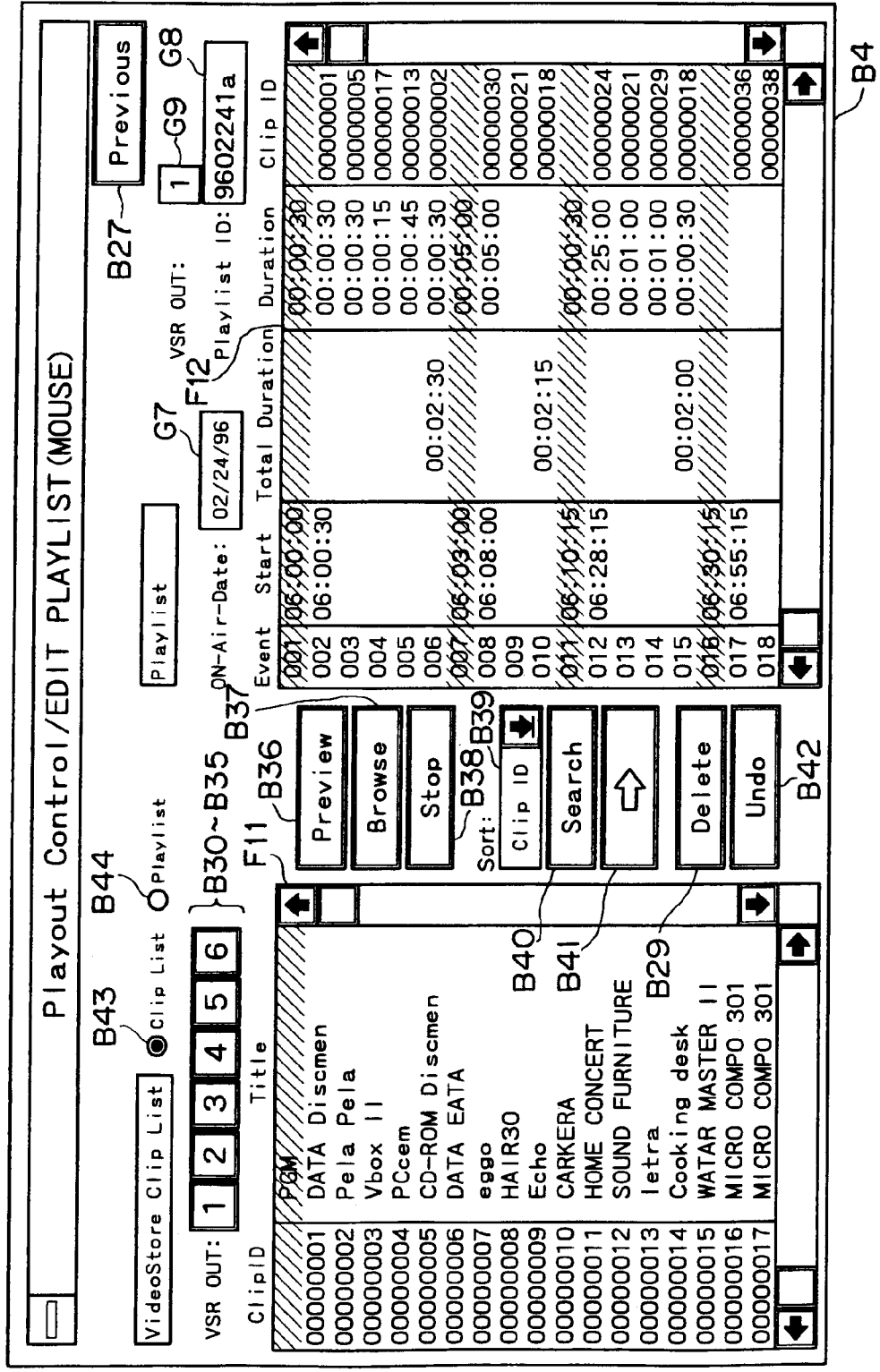
FIG. 14 is a diagrammatic view showing a detailed construction of another edit playlist image.

Here, if the edit mouse button B25 is selected and clicked by a manual operation of an operator, then the work region E4 for newly producing or modifying a playlist using such a mouse 62B as shown in FIG. 14 is displayed on the monitor 56B. In this connection, the work screen image E4 is on the same level as the work screen image E3.

On the mouse work screen image E4, a clip ID "Clip ID" indicating clips which can be selected to produce playlists and a title "Title" indicating clip names are displayed in a display region F11. The mouse work screen image E4 further has a display region F12 in which an event "Event", a start "Start" indicating output starting times, a total duration "TotalDuration" representative of total output times and a clip ID "Clip ID" are to be displayed. In the display region F12, a selected clip is displayed.

Further provided on the edit playlist work screen image E4 for a mouse are, in addition to a previous button B27 ("Previous") having a same function as that on the work screen image E3 and a delete button B29 ("Delete") for deleting a clip being displayed, buttons B30 to B35 for selecting an output channel for a playlist, a preview button B36 ("Preview") for outputting a selected playlist, a browse button B37 ("Browse") for outputting the selected play list only for a predetermined period of time, a stop button B38 ("Stop") for stopping outputting, a sort button B39 ("Sort") for sorting the order of clips, a search button B40 ("Search") for displaying the search image E6 for retrieving an object clip, an arrow mark button B41 for inserting a clip clicked in the display region F11 into a clicked position of the display region F12, and an undo button B42 ("Undo") for returning the image state to a directly preceding execution state.

Figure 15:
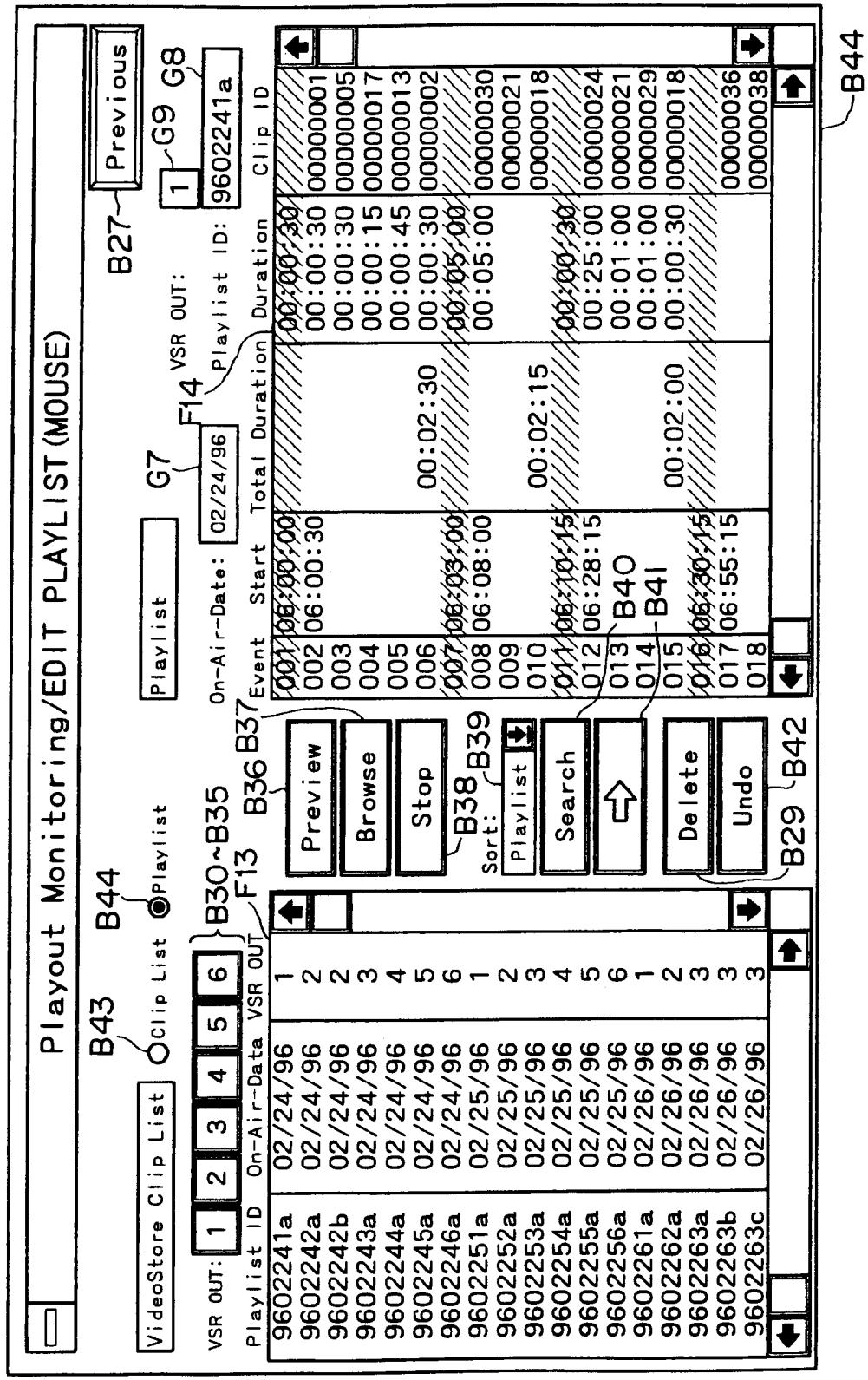
FIG. 15 is a diagrammatic view showing a detailed construction of a further edit playlist image.

While, in the work screen image E4, the setting is such that the button B43 is selected, if the button B44 is selected, then such a work screen image E44 on which playlists are displayed in a list in place of the clip lists as shown in FIG. 15 is displayed on the same level as that of the work screen image E4 for a mouse. In this connection, the work screen image E44 is used as a work screen image on the same level for editing of a playlist. This work screen image E44 has a same image configuration as that of the work screen image E4 except that the work screen image E44 displays information for production of or modification to contents of a playlist.

Further, if the playlist table is selected on the work screen image E3, such a work screen image E5 as shown in FIG. 16 is displayed on the monitor 56B. On the playlist table work screen image E5, on air dates and output destination channels (VSR OUT) are displayed in columns in a list in a corresponding relationship to playlist IDs in a display region F20. Further, on the playlist table work screen image E5, an open button B50 ("Open") for developing contents of a playlist on the work screen image E3, E4 or E44 and a cancel button B51 ("Cancel") for cancelling the display of the playlist table work screen image E5 are provided.

Figure 17:
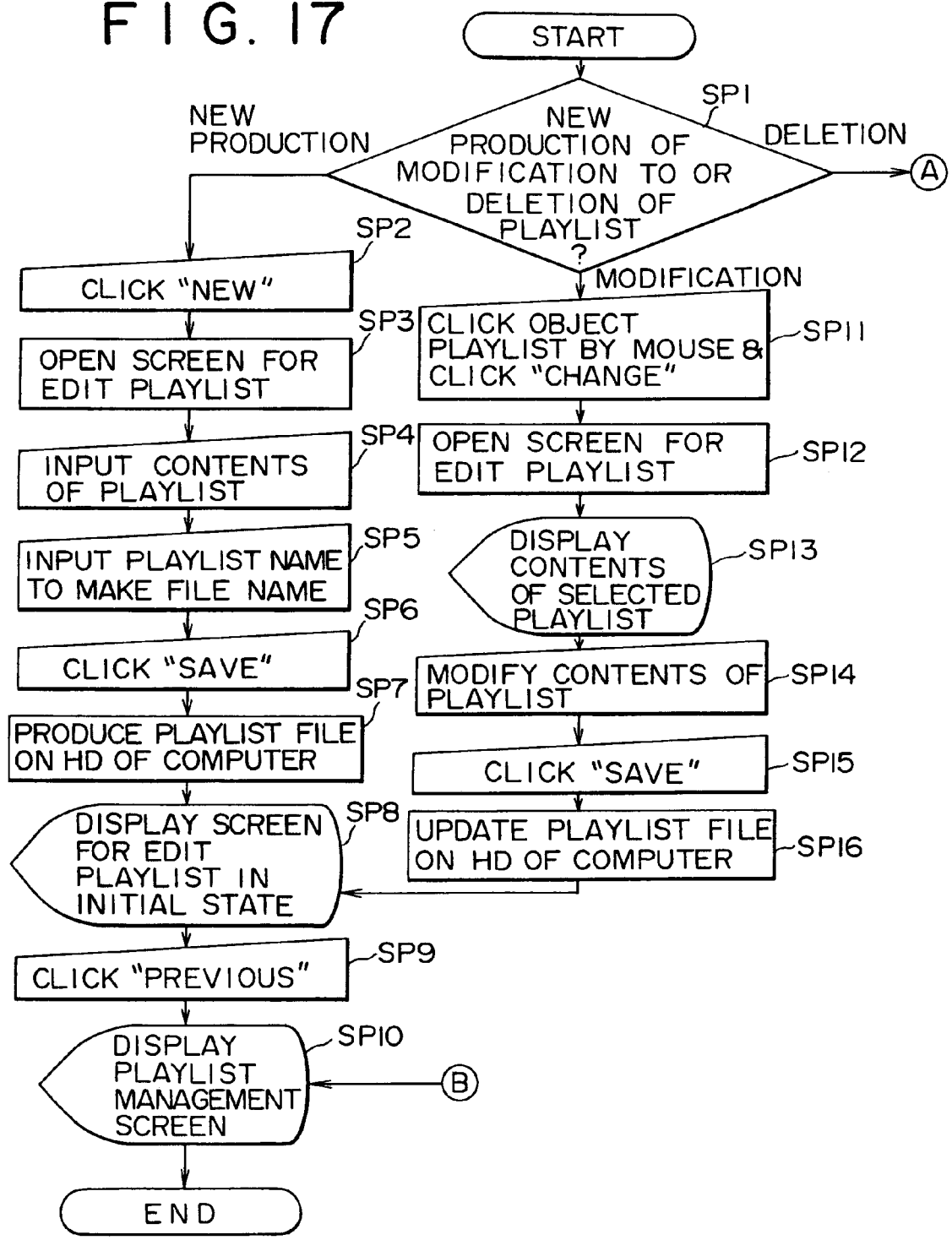
FIGS. 17 and 18 are flow charts illustrating a playlist new production, modification and deletion procedure.
Figure 18:
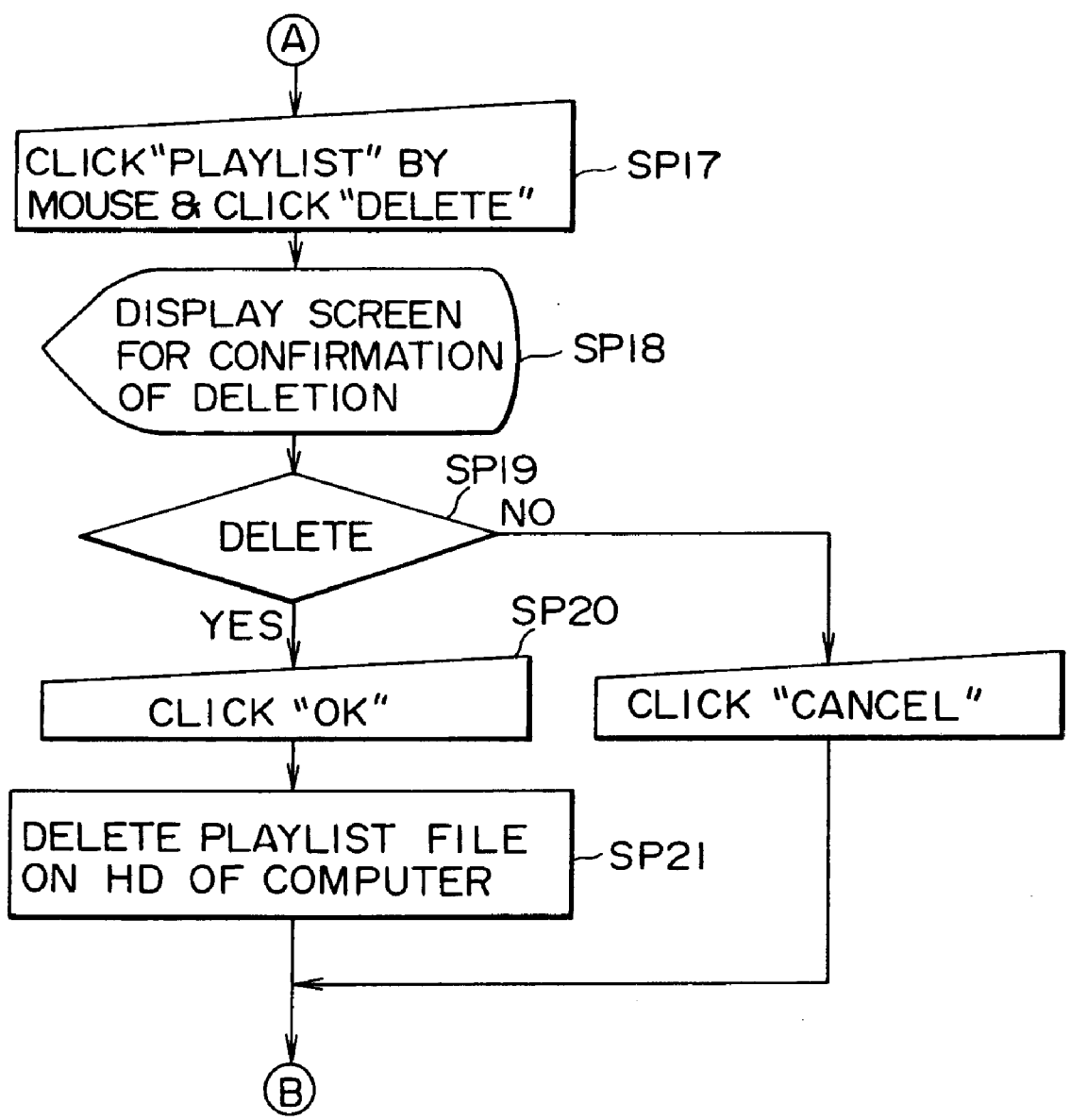

3-2. New Production of, Modification to and Deletion of a Playlist by Playlist Control Actual processing for newly producing, modifying or deleting a playlist is executed by such a playlist new production, modification and deletion procedure as illustrated in FIGS. 17 and 18 in accordance with the playlist control program.

In particular, in the CPU processing in accordance with the playlist control program, if the playlist management is selected on the menu screen image M1, then in step SP1, whether a play list is to be newly produced, modified or deleted is selected by clicking one of the selection button B17 "New", selection button B18 "Change" and selection button B15 "Delete" displayed on the work screen image E1.

Here, when new production of a playlist is to be selected, the selection button B17 "New" is clicked in step SP2. Consequently, the CPU processing advances to step SP3, in which the edit playlist work screen image E3 is displayed on the monitor 58B.

In next step SP4, the operator will input contents of a playlist for new production using the keyboard 60B, and in next step SP5, the operator will input a file name for a playlist. Consequently, a playlist is produced newly. In this instance, the selection button B25 "Edit(Mouse)" may be clicked to open the work screen image E4 or E44 in place of the work screen image E3 to produce a playlist.

Then, if the selection button B22 "Save" is clicked in step SP6, then a file of the newly produced playlist is produced on the RAM 53B. In next step SP7, the CPU processing stores the newly produced playlist file onto the hard disk (HD) 57B.

Thereafter, in step SP8, the edit playlist work screen image E3 for an initial state is displayed on the monitor 56B by the CPU processing. Here, if the operator clicks the selection button B27 "Previous", then in next step SP10, the playlist management work screen image E1 is displayed on the monitor 56B by the CPU processing. The procedure for new production of a playlist from within the playlist new production, modification and deletion procedure by the CPU processing is completed thereby.

On the other hand, if the operator selects the modification to a playlist in step SP1, then the object playlist will be clicked and then the selection button B18 "Change" will be clicked in step SP11. Consequently, the CPU processing advances to step SP12, in which the file of the edit playlist is opened. Then, in next step SP13, the edit playlist work screen image E3 is displayed on the monitor 58B.

Here, in next step SP14, the operator will input contents of the playlist to modify the playlist using the keyboard 60B. In this instance, the selection button B25 "Edit(Mouse)" may be clicked to open the work screen image E4 or E5 in place of the work screen image E3 to produce a playlist using the mouse 62B.

Then, if the operator clicks the selection button B22 "Save" in step SP15, then a file of the modified playlist is produced on the RAM 53B. Then, in next step SP16, the playlist file modified by the edit playlist processing is stored onto the hard disk 57B by the CPU processing.

Then, the CPU processing advances to step SP8, in which the edit playlist work screen image E3 in an initial state is displayed on the monitor 56B. Thereafter, the playlist management work screen image E2 is displayed on the monitor 56B by the CPU processing in steps SP9 and SP10. The procedure for modification to a playlist from within the playlist new production, modification and deletion procedure by the CPU processing is completed thereby.

On the other hand, if the operator selects the deletion of a playlist in step SP1, then the selection button B15 "Delete" will be clicked in step SP17. Consequently, the CPU processing advances to step SP18, in which a confirmation image for deletion of the designated playlist is displayed on the monitor 56B.

Then, if the operator confirms the deletion of the playlist in next step SP19, then the CPU processing advances to step SP20, in which "OK" on the confirmation image will be clicked. Consequently, in step SP21, the playlist file stored on the hard disk 57B of the computer 24 is deleted by the CPU processing.

Thereafter, the CPU processing advances to step SP10, in which the playlist management work screen image E2 is displayed on the monitor 56B, thereby ending the procedure for deletion of a playlist.

On the other hand, if it is decided in step SP19 that the playlist should not be deleted, then the CPU processing immediately advances to step SP10 so that the playlist management work screen image E2 is thereafter displayed on the CRT monitor 56B by the CPU processing, thereby ending the procedure for deletion of a playlist.

3-3. Playlist Control for Sending-out of Decode Data to the Monitor

Figure 19:
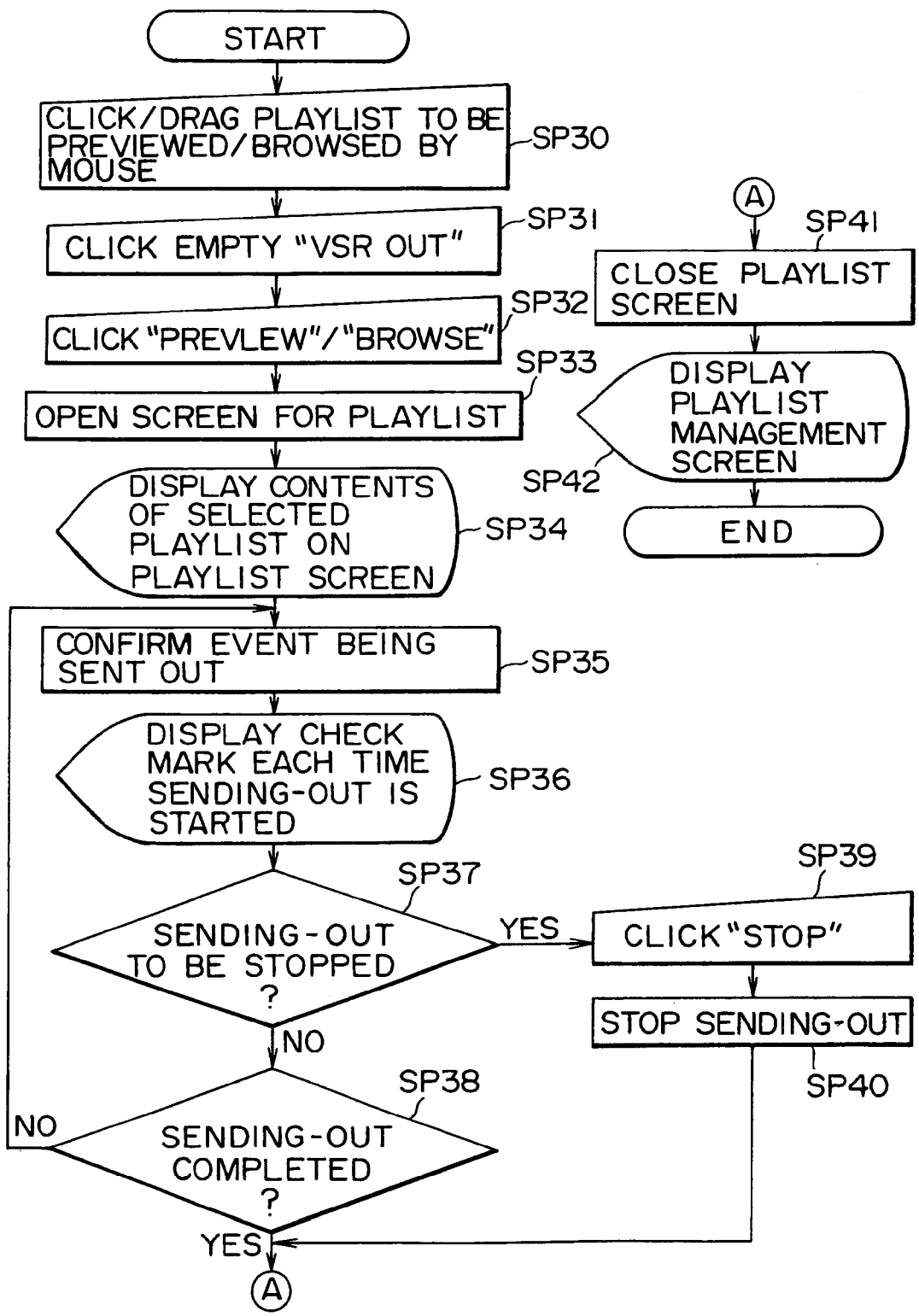
FIG. 19 is a flow chart illustrating a playlist monitoring procedure.

Here, if the operator wants to monitor decode data, the CPU processing is executed in accordance with such a playlist monitoring procedure in accordance with playlist control program as illustrated in FIG. 19.

In the playlist monitoring procedure, an object playlist to be previewed or browsed is clicked/dragged, first in step SP30, on the playlist management work screen image E1 using the mouse 62B. Then, in step SP31, a free channel is searched for to select a predetermined output channel from among the buttons B6 to B11. Then, in next step SP32, the button B13 "Preview" or the button B14 "Browse" is clicked.

As a result, the file of the playlist is opened by the CPU processing in step SP33, and then in next step SP34, contents of the selected object playlist are displayed on the playlist work screen image E2.

Then, if an event of the playlist being sent out to the output channel is conformed by the CPU processing in step SP35, then in step SP36, a check mark is displayed in the item of the event of the work screen image E2 each time sending-out of a clip is started. Consequently, the operator can confirm the clip being sent out at present on the work screen image E2.

Here, it is discriminated in step SP37 whether or not sending-out of the playlist should be stopped intermediately. If the playlist should be continued to be sent out, then the CPU processing advances to step SP38, in which it is discriminated whether or not the playlist has been sent out completely. Thus, the loop processing of steps SP35 to SP38 is executed until the playlist is sent out completely. Then, after the playlist is sent out completely, the CPU processing advances to step SP41.

On the contrary, if sending-out of the playlist should be stopped intermediately in step SP37, then the CPU processing advances to step SP39, in which the operator will click the button B21. Consequently, sending-out of the playlist is stopped by the CPU processing in step SP40, whereafter the CPU processing advances to next step SP41.

In step SP41, the playlist work screen image E2 is closed by the CPU processing, and in next step SP42, the playlist management work screen image E1 is displayed. The playlist monitoring procedure according to the playlist control program is completed thereby.

3-4. Operation and Effects of the Embodiment

In the television broadcasting system having the construction described above, the playout section 16 stores encode data of images/sound of a clip sent out from the encoding processing section 15 once onto a storage device such as a media unit 26 and edits the playlist in accordance with the playlist control program.

First, when a playlist is to be produced newly, the edit playlist work screen image E3 or E4 is opened on the monitor 56B of the playout section 16. While clip information is conformed as contents of a playlist from the display region F10 or F12, contents of the playlist are inputted to produce a file and the file is stored onto the hard disk 57B.

However, when contents of a playlist are to be modified, the edit playlist work screen image E3 or E4 is opened on the monitor 56B of the computer 24, and while the clip information is confirmed as contents of the playlist in the display region F10 or F12, the contents of the playlist are modified to produce a file, and the file of the playlist stored in the hard disk 57B is updated with the newly produced file.

Consequently, a playlist can be selected as an object of new production or modification processing in units of a file on the work screen image E1 or E44, and each clip can be inputted or modified while individual information is confirmed on the work screen image E3 or E4. Thus, the efficiency in program editing can be improved.

On the other hand, when contents of a playlist are to be deleted, the playlist management work screen image E1 is opened on the monitor 58B of the computer 24, and while contents of the playlist such as a broadcasting date are conformed in the work region G1, deletion of one or a plurality of playlists can be set by a manual click/drag operation by the mouse 62B.

Consequently, while broadcasting dates and so forth of playlists are observed on the work screen image E1, playlists broadcast already can be confirmed and one or a plurality of playlists can be selected and deleted readily.

Furthermore, when processing for modification to or deletion of a playlist is to be performed, contents of playlists are sent out to output channels for the object of testing by preview or browse from the playlist management work screen image E1, and information such as outputting starting times, ending times, broadcasting times and clip IDs regarding clips in the playlists is outputted to the work screen image E2 and then outputted to and displayed on the monitor 56B. Consequently, actual video/audio outputs of the playlists can be processed while contents of the playlists are monitored on an image outputting monitor by a simple procedure.

In the television broadcasting system having the construction described above, information of individual clips can be inputted or modified while it is confirmed based on a image display of the work screen image E3 or E4. Further, as an upper hierarchy, playlists formed from information regarding a plurality of clips can be produced in units of a playlist on the work screen image E1 or E44. Besides, since playlist information produced based on the image display of the work screen image E3 or E4 is added as attributes to playlists to the playlists, editing of the playlists is facilitated, and consequently, efficiency in program editing can be raised.

Furthermore, with the television broadcasting system of the embodiment described above, while a broadcasting date and so forth of a playlist is observed on the work list E1, whether the playlist has been broadcast already can be confirmed. Consequently, one or a plurality of playlists can be selectively deleted readily.

Furthermore, when processing for modification to or deletion of a playlist is to be performed, contents of playlists are sent out to output channels for the object of testing by preview or browse from the playlist management work screen image E1, and information such as outputting starting times, ending times, broadcasting times and clip IDs regarding clips in the playlists is displayed on the work screen image E2 and then outputted so as to be displayed on the monitor 56B. Further, actual video/audio outputs of the playlists can be processed while contents of the playlists are monitored on an image outputting monitor by a simple procedure.

In particular, a playlist work screen image formed by inputting, updating or deleting a plurality of clips and additional information to the clips and another image which displays a plurality of playlists in a table so that one playlist can be produced, updated or deleted are provided in such a manner as to allow transition between them while allowing a work to be performed in units of information displayed on each of the screens and besides allowing observation of a series of video and audio data of a playlist being worked. Thus, transition to one of the images is performed when necessary, and consequently, a work can be performed while confirming whether or not a desired result has been reached. The working efficiency can be raised by hierarchically processing data in this manner.

4. Other Embodiments

While, in the embodiment described above, video data are encoded in accordance with the MPEG2 standards, the present invention is not limited to this, and, for example, the MPEG1 standards may be used as the system for encoding video data. Further, while a clip is described as a CM video clip, it is not limited to this, and any clip for a drama, a cinema, a song or the like may be used if it is a series of data.

Having now fully described the invention, it will be apparent to one of ordinary skill in the art that many changes and modifications can be made thereto without departing from the spirit and scope of the invention as set forth herein.

What is claimed is:

1. A hierarchical processing apparatus for providing video and audio data to be output on a plurality of channels, comprising:

a storage device for storing a plurality of video and audio clips;

an image of a first hierarchy for displaying a plurality of playlists to be output on said plurality of channels, each of said playlists designating a plurality of clips, each of said clips including at least one designation of video data, audio data and additional identifying information to be displayed upon selection of one of said plurality of playlists, and for selecting one of the playlists to determine a playlist to be modified or deleted; and an image of a second hierarchy, including additional identifying information for each of a plurality of clips in a selected playlist, allowing the selection of one of the identifying information for one of the plurality of clips and for modifying the selected additional identifying information to modify at least the selected playlist, or to produce a new playlist, at any time;

wherein the image of the first hierarchy and the image of the second hierarchy allow transition there between and allow reproduction of the video and audio data of a clip included in the selected playlist from said storage device at any time, and wherein each channel in said plurality of channels has a monitoring means to monitor the video and audio data output on said channel in accordance with a corresponding playlist, and said monitoring means can modify the video and audio data output on said channel.

2. A hierarchical processing apparatus for video and audio data according to claim 1, wherein said hierarchical processing apparatus has a retrieving function of retrieving, when one of the clips is to be selected, a desired clip by inputting information for specifying the clip.

3. A hierarchical processing apparatus for video and audio data according to claim 1, wherein the image of the first hierarchy and the image of the second hierarchy are graphical user interfaces.

4. A hierarchical processing apparatus for video and audio data according to claim 3, wherein the image of the first hierarchy has a function of designating a sort key for determining an order in which the playlists are to be displayed in a list.

5. A hierarchical processing apparatus for video and audio data according to claim 3, wherein, when video and audio data of a clip included in the selected playlist are reproduced, a mark is displayed which indicates which one of the plurality of clips included in the playlist is reproduced.

6. A hierarchical processing apparatus for video and audio data according to claim 3, wherein, when a clip is to be selected from within a list of a plurality of clips formed from video and audio data, the clip is selected using a mouse.

7. A hierarchical processing apparatus for video and audio data according to claim 3, wherein, when a clip is to be selected from within a list of a plurality of clips formed from video and audio data, a clip ID is inputted from a keyboard.

8. A hierarchical processing apparatus for video and audio data according to claim 3, wherein, when a clip is to be selected from within a list of a plurality of clips formed from video and audio data, a method of selecting the clip using a mouse and another method of inputting a clip ID from a keyboard can be selected alternatively.

9. A hierarchical processing apparatus for video and audio data according to claim 3, wherein a plurality of ones of the playlists can be selected and deleted at a time.

10. A hierarchical processing apparatus for video and audio data according to claim 1, wherein a server in which the video and audio data of the clips are recorded is connected to said hierarchical processing apparatus and outputs the video and audio data of the clips based on the playlists.

11. A hierarchical processing apparatus for video and audio data according to claim 1, wherein each output is a broadcast channel.

12. A hierarchical processing method for providing video data, audio data to be output on a plurality of channels, comprising the steps of:

storing a plurality of video and audio clips in a storage device;

displaying a plurality of playlists designating a plurality of clips which are video and audio data and additional identifying information to be displayed upon selection of one of said plurality of playlists selecting one of the playlists at any time;

determining that the selected playlist should be modified;

selecting one of the additional identifying information corresponding to one of the plurality of clips from said selected playlist;

modifying the selected additional identifying information to modify the selected playlist, to produce a new playlist, or else deleting the selected additional identifying information corresponding to one of said plurality of clips at any time;

reproducing the video and audio data of a clip designating in the playlist from said storage device when required; and monitoring the video and audio data output in accordance with a corresponding playlist on each channel in said plurality of channels using a monitoring means, wherein said monitoring means can modify the video and audio data output on said channel.

13. A hierarchical processing method for video and audio data according to claim 12, wherein detailed contents of the playlist which is determined to be modified are displayed.

14. A hierarchical processing method for video and audio data according to claim 11, wherein each output is a broadcast channel.

* * * * *